(12) United States Patent
Itou et al.

(10) Patent No.: US 12,063,936 B2
(45) Date of Patent: Aug. 20, 2024

(54) FOOD PRODUCTION APPARATUS, ROTATION METHOD AND FOOD PRODUCTION METHOD

(71) Applicant: NICHIREI FOODS INC., Tokyo-to (JP)

(72) Inventors: Ryuichi Itou, Chiba (JP); Suguru Hirayama, Chiba (JP); Toru Iwasa, Chiba (JP); Minoru Mamiya, Chiba (JP)

(73) Assignee: NICHIREI FOODS INC., Tokyo (JP)

( * ) Notice: Subject to any disclaimer, the term of this patent is extended or adjusted under 35 U.S.C. 154(b) by 191 days.

(21) Appl. No.: 17/633,816

(22) PCT Filed: Aug. 7, 2020

(86) PCT No.: PCT/JP2020/030327
§ 371 (c)(1),
(2) Date: Feb. 8, 2022

(87) PCT Pub. No.: WO2021/029345
PCT Pub. Date: Feb. 18, 2021

(65) Prior Publication Data
US 2022/0295802 A1 Sep. 22, 2022

(30) Foreign Application Priority Data
Aug. 9, 2019 (JP) ................. 2019-147800

(51) Int. Cl.
*A21C 9/08* (2006.01)
*A21C 11/10* (2006.01)
*B65G 47/244* (2006.01)

(52) U.S. Cl.
CPC ............. *A21C 9/08* (2013.01); *A21C 11/10* (2013.01); *B65G 47/244* (2013.01); *B65G 2201/0202* (2013.01)

(58) Field of Classification Search
None
See application file for complete search history.

(56) References Cited

U.S. PATENT DOCUMENTS 4,457,419 A * 7/1984 Ogami ................ B65G 47/244
198/346.2
8,550,228 B1 10/2013 Wei et al.
(Continued)

FOREIGN PATENT DOCUMENTS

CN 206842340 U 1/2018
JP 2002-226082 A 8/2002
(Continued)

OTHER PUBLICATIONS

International Search Report for PCT/JP2020/030327 mailed on Oct. 27, 2020.
(Continued)

*Primary Examiner* — William R Harp
(74) *Attorney, Agent, or Firm* — Birch, Stewart, Kolasch & Birch, LLP

(57) ABSTRACT

A food production apparatus, a rotation method and a food production method which stably and accurately rotate a foodstuff workpiece by a desired angle are provided. At least any one of a first rotation unit (31) and a second rotation unit (32) is moved in such a manner that a foodstuff workpiece (W) is nipped and held by the first rotation unit (31) and the second rotation unit (32). The first rotation unit (31) and the second rotation unit (32) which nip and hold the foodstuff workpiece (W) are actively rotated in synchronization with each other. At least any one of the first rotation unit (31) and the second rotation unit (32) is moved in such a manner that the foodstuff workpiece (W) is released from the first rotation unit (31) and the second rotation unit (32).

13 Claims, 13 Drawing Sheets

(56) References Cited

U.S. PATENT DOCUMENTS

2003/0041712 A1  3/2003  Tsuruta
2003/0075030 A1  4/2003  Tsuruta
2011/0036245 A1  2/2011  Ueno et al.

FOREIGN PATENT DOCUMENTS

JP    2009-261310 A   11/2009
JP    2010-246480 A   11/2010
JP       5647777 B2    1/2015

OTHER PUBLICATIONS

Written Opinion of the International Searching Authority for PCT/JP2020/030327 (PCT/ISA/237) mailed on Oct. 27, 2020.
English translation of International Preliminary Report on Patentability and Written Opinion of the International Searching Authority for International Application No. PCT/JP2020/030327, dated Feb. 17, 2022.

\* cited by examiner

FOOD PRODUCTION APPARATUS, ROTATION METHOD AND FOOD PRODUCTION METHOD

TECHNICAL FIELD

The present invention relates to a food production apparatus, a rotation method, and a food production method.

BACKGROUND ART

A variety of processed food products are widely offered to stores as well as to the general public. Processed food products can be offered in a variety of forms, such as room temperature food products, refrigerated food products, chilled food products, and frozen food products, by the development of food processing technology (in particular, the development of the technology of refrigeration and freezing). The demand for such processed food products is expected to increase in the future with the diversification of consumer tastes, the growing need for convenience, and the increasing awareness of food safety. In particular, it is desirable to provide not only processed food products that are easy to process, but also processed food products that are complex and difficult to process.

Such processed food products include, for example, rolled food products such as spring rolls and egg rolls. In order to make a rolled food, it is necessary to wrap and roll up ingredients with a skin made of flour or other material. Suitable skill and experience are necessary to roll ingredients neatly and properly with a skin, and such a task is very difficult for those who are not accustomed to cooking and is often avoided. In addition, making a large quantity of rolled food products with uniform quality is difficult even for those who are familiar with cooking and is a time-consuming and troublesome task. Therefore, processors use food production apparatuses that can automatically make such rolled food products to produce a large quantity of rolled food products.

For example, Patent Literature 1 teaches an apparatus for producing food products using polygonal dough sheets and in particular, discloses a device for rotating a dough sheet by a predetermined angle during the conveyance of the dough sheet.

Further, Patent Literature 2 discloses a swing apparatus that swings a triangular-shaped cut piece which has been cut out and separated from a sheet of food dough, by 90 degrees in each of the forward rotation direction and the reverse rotation direction.

CITATION LIST

Patent Literature

Patent Literature 1: U.S. Pat. No. 8,550,228
Patent Literature 2: Japanese patent No. 5647777

SUMMARY OF INVENTION

Technical Problem

As described above, sheet-shaped foodstuff workpieces, such as skins, may be rotated by a desired angle to be adjusted in posture and then be sent to a later stage. In this case, it is necessary to rotate a foodstuff workpiece stably and accurately in order to perform stable and highly accurate food processing in the later stage. However, it is not easy to continuously rotate a large number of foodstuff workpieces in a stable and accurate manner. In particular, since the shape and the posture of a flexible sheet-shaped foodstuff workpiece tend to change unintentionally during rotation, it is difficult to stably rotate such a foodstuff workpiece by a desired angle.

According to the apparatus of Patent Literature 1, a dough sheet is rotated by rotating a plurality of push bars in a state where the dough sheet is sandwiched between a press plate and the plurality of push bars. However, in the apparatus of Patent Literature 1, while the push bars are actively rotated by power from a power source, the press plate is rotatably provided but is not actively rotated. As a result, the press plate may fail to properly follow the rotation of the push bars when a dough sheet is rotated, and a discrepancy may occur between the number of rotation of the press plate and the number of rotation of the plurality of push bars. In this case, the press plate works to inhibit the rotation of the dough sheet, and thus if the dough sheet is not properly held by the plurality of push bars, the dough sheet may fail to be rotated by a desired angle.

If proper parts of a dough sheet are held by a plurality of push bars, the dough sheet can be stably and accurately rotated by the apparatus of Patent Literature 1; however, the size and the shape of such a dough sheet are limited based on the arrangement of the plurality of push bars. In particular, the size and the shape of a dough sheet that can be properly rotated are very limited because the plurality of push bars in the apparatus of Patent Literature 1 are located equidistant from each other from the center of rotation. For example, a dough sheet which has a planar shape of a regular polygon or a true circle and has a planar length approximately equal to the horizontal distance between push bars may be able to be rotated stably and accurately by the apparatus of Patent Literature 1. However, it may be difficult, for example, to properly hold a dough sheet having a planar length larger than the horizontal distance between push bars, by the plurality of push bars of the Patent Literature 1. In particular, in a case where a dough sheet is conveyed by a conveyor having a gap, such as the belt conveyor of Patent Literature 1, if the dough sheet is rotated in a state where the outer periphery part of the dough sheet is not properly held by the push bars, the outer periphery part of the dough sheet could unintentionally enter the gap of the conveyor, so that the dough sheet may be twisted or damaged.

On the other hand, in the swing apparatus of Patent Literature 2, a cut piece having been separated from a food dough are rotated in a state of being pierced by pins on a conveyor. Therefore, it is difficult to use the swing apparatus of Patent Literature 2 for foodstuff workpieces that cannot be pierced by pins, foodstuff workpieces which are undesirable to be pierced with pins, and foodstuff workpieces which are undesirable to be subjected to frictional force from the conveyor during rotation. For example, if a very soft or brittle foodstuff workpiece is rotated by the swing apparatus of Patent Literature 2, the foodstuff workpiece may be twisted or damaged due to pin pricks and frictional forces received from the conveyor. Further, as holes are formed in a foodstuff workpiece due to the pins piercing the foodstuff workpieces, there are concerns that ingredients wrapped in the foodstuff workpiece may leak from the holes and that the periphery part of the holes in the foodstuff workpiece may break, for example.

As described above, it is not easy to rotate a sheet-shaped foodstuff workpiece stably and accurately by a desired angle. If a foodstuff workpiece is not rotated accurately, the accuracy of a food processing performed in a later stage will also deteriorate. Further, if a foodstuff workpiece is twisted or damaged during rotation of the foodstuff workpiece, the production line may have to be stopped to correct the shape and the posture of the foodstuff workpiece or to remove a defective foodstuff workpiece. In a case where a foodstuff workpiece is not stably and accurately rotated by a desired angle in this manner, not only is the accuracy of food processing performed in a later stage unstable, but also the speed-up and the improvement of yield of food processing may be hindered.

The present invention has been contrived in view of the above-mentioned circumstances, an object of the present invention is to provide a technology for stably and accurately rotating a foodstuff workpiece by a desired angle.

Solution to Problem

One aspect of the present invention is directed to a food production apparatus comprising: a first conveyor which conveys a foodstuff workpiece; a rotation machine which rotates the foodstuff workpiece; and a control unit that controls the rotation machine, wherein: the rotation machine includes a first rotation unit and a second rotation part which are provided to be actively rotatable, at least any one of the first rotation unit and the second rotation unit being provided to be movable in such a manner that a distance of the first rotation unit and the second rotation unit is variable, the control unit controls rotation of both the first rotation unit and the second rotation unit and movement of at least any one of the first rotation unit and the second rotation unit in such a manner that: at least any one of the first rotation unit and the second rotation unit is moved in such a manner that the foodstuff workpiece is nipped and held by the first rotation unit and the second rotation unit; the first rotation unit and the second rotation unit in a state of nipping and holding the foodstuff workpiece are actively rotated in synchronization with each other; and at least any one of the first rotation unit and the second rotation unit is moved to release the foodstuff workpiece from the first rotation unit and the second rotation unit.

The first conveyor may include a plurality of string-shaped members, the second rotation unit may be provided at a position facing the first rotation unit and includes a plurality of protrusion portions extending toward the first rotation unit, and when the first rotation unit and the second rotation unit nip and hold the foodstuff workpiece, the plurality of protrusion portions may penetrate between string-shaped members and may lift the foodstuff workpiece from the first conveyor.

Another aspect of the present invention is directed to a food production apparatus comprising: a first conveyor which includes a plurality of string-shaped members and conveys a foodstuff workpiece; a rotation machine which rotates the foodstuff workpiece; and a control unit which controls the rotation machine, wherein: the rotation machine includes: a first rotation unit; and a second rotation unit which is provided at a position facing the first rotation unit and includes a plurality of protrusion portions extending toward the first rotation unit, one of the first rotation unit and the second rotation unit is provided to be able to rotate actively, and the other is provided to be able to rotate passively, the control unit controls movement and rotation of at least any one of the first rotation unit and the second rotation unit in such a manner that: the first rotation unit and the second rotation unit nip and hold the foodstuff workpiece; one of the first rotation unit and the second rotation unit is actively rotated in a state where the first rotation unit and the second rotation unit nip and hold the foodstuff workpiece; and the foodstuff workpiece is released from the first rotation unit and the second rotation unit.

The plurality of protrusion portions may include: two or more inner protrusion portions provided at positions which are relatively close to a rotation axis of the second rotation unit; and one or more outer protrusion portions which are relatively far apart from the rotation axis of the second rotation unit.

The first rotation unit may include one or more projecting portions which project toward the second rotation unit and face the plurality of protrusion portions.

The food production apparatus may further comprise: a foodstuff workpiece supply unit which sends out the foodstuff workpiece; and a second conveyor which receives from above the foodstuff workpiece sent out from the foodstuff workpiece supply unit and delivers the foodstuff workpiece to the first conveyor, wherein, per unit length in a conveyance direction of the foodstuff workpiece, a contact area between the second conveyor and the foodstuff workpiece placed on the second conveyor may be larger than a contact area between the first conveyor and the foodstuff workpiece placed on the first conveyor.

A distance between the second conveyor and the first conveyor may be set to a distance such that in a state where a part of the foodstuff workpiece is placed on the second conveyor, another part of the foodstuff workpiece lands on the first conveyor.

Another aspect of the present invention is directed to a rotation method of rotating a foodstuff workpiece, comprising the steps of: moving at least any one of a first rotation unit and a second rotation unit in such a manner that the first rotation unit and the second rotation unit nip and hold the foodstuff workpiece; actively rotating the first rotation unit and the second rotation unit which nip and hold the foodstuff workpiece in synchronization with each other; and moving at least any one of the first rotation unit and the second rotation unit to release the foodstuff workpiece from the first rotation unit and the second rotation unit.

Another aspect of the present invention is directed to a rotation method of rotating a foodstuff workpiece, comprising the steps of: conveying the foodstuff workpiece by a first conveyor including a plurality of string-shaped members, a first rotation unit and a second rotation unit being provided to face each other, the second rotation unit including a plurality of protrusion portions extending toward the first rotation unit; moving at least any one of the first rotation unit and the second rotation unit in such a manner that the foodstuff workpiece is nipped and held by the first rotation unit and the second rotation unit; actively rotating one of the first rotation unit and the second rotation unit while the other rotates passively, in a state where the first rotation unit and the second rotation unit nip and hold the foodstuff workpiece; and moving at least any one of the first rotation unit and the second rotation unit in such a manner that the foodstuff workpiece is released from the first rotation unit and the second rotation unit.

Another aspect of the present invention is directed to a food production method of rotating a foodstuff workpiece, comprising the steps of: moving at least any one of a first rotation unit and a second rotation unit in such a manner that the foodstuff workpiece is nipped and held by the first rotation unit and the second rotation unit; actively rotating the first rotation unit and the second rotation unit which nip and hold the foodstuff workpiece in synchronization with each other; and moving at least any one of the first rotation unit and the second rotation unit in such a manner that the foodstuff workpiece is released from the first rotation unit and the second rotation unit.

Another aspect of the present invention is directed to a food production method of rotating a foodstuff workpiece, comprising the steps of: conveying the foodstuff workpiece by a first conveyor including a plurality of string-shaped members, a first rotation unit and a second rotation unit being provided to face each other, the second rotation unit including a plurality of protrusion portions extending toward the first rotation unit; moving at least any one of the first rotation unit and the second rotation unit in such a manner that the foodstuff workpiece is nipped and held by the first rotation unit and the second rotation unit; actively rotating one of the first rotation unit and the second rotation unit while the other rotates passively, in a state where the first rotation unit and the second rotation unit nip and hold the foodstuff workpiece; and moving at least any one of the first rotation unit and the second rotation unit in such a manner that the foodstuff workpiece is released from the first rotation unit and the second rotation unit.

Advantageous Effects of Invention

According to the present invention, a foodstuff workpiece can be stably and accurately rotated by a desired angle.

DESCRIPTION OF EMBODIMENTS

By way of example, typical embodiments of the present invention are described below with reference to the drawings. For convenience of illustration and understanding, the size and the scale of the elements shown in each drawing do not necessarily match a real thing, and further, the size and the scale of the elements do not necessarily match between drawings. However, those who skilled in the art can clearly grasp the configuration and function effects of the elements shown in each drawing, taking into account the explanation in the description and the claims of the present application.

In the present description, unless otherwise specified, the terms of "up" and "down" are based on the vertical direction which is the direction of the action of gravity, the vertical direction is the downward direction, and the direction opposite to the vertical direction is the upward direction.

The height direction is a direction along the vertical direction, and the horizontal direction is a direction forming a right angle with the vertical direction. Further, unless otherwise noted, the terms of "upstream" and "downstream" are based on the direction of conveyance of a foodstuff (a dough and a foodstuff workpiece described below).

In the following embodiments, an apparatus of producing spring rolls (a food production apparatus) is described as an example, and spring roll skins are used as "foodstuff workpieces". However, the present invention is not limited to the embodiments described below and can be applied to food products other than spring rolls. Typically, the invention can be suitably applied to food products in which a sheet of flexible skin is used to wrap ingredients. However, the present invention can also be applied to apparatuses and methods of producing other food products, and for example, the present invention can also be applied to apparatuses of producing rolled food products formed by only a skin without any ingredients being placed therein (e.g., a rolled food product made of a sheet-shaped food formed by baking or steaming an egg).

Figure 1:
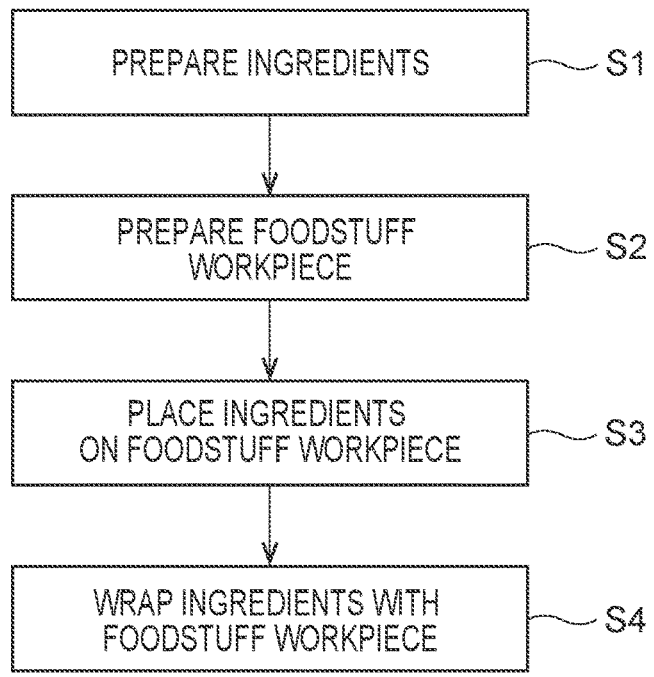
FIG. 1 is a flowchart showing an example of a food production method.

FIG. 1 is a flowchart showing an example of a food production method.

In a food production apparatus of producing spring rolls, first, ingredients are prepared (S1 in FIG. 1) and a foodstuff workpiece (in the present example, a skin) to wrap the ingredients with is prepared (S2). The foodstuff workpiece has a shape and a size suitable for wrapping ingredients. A foodstuff workpiece having a desired shape and a desired size may be prepared in advance before being supplied to the food production apparatus or may be made in the food production apparatus. Typically, in the food production apparatus, a foodstuff workpiece can be cut out from a large sheet of food dough.

Then, a desired amount of ingredients is placed on top of a foodstuff workpiece (S3), and the foodstuff workpiece is folded in such a manner that the ingredients are wrapped by the foodstuff workpiece (S4).

By performing the series of processes described above (S1 to S4) at high speed and in a continuous manner, food products (in the present embodiment, spring rolls) including foodstuff workpieces and ingredients can be produced in large quantities. Foodstuff workpieces that can be used in the above-mentioned food production method are not limited, and any foodstuff workpiece of any shape, size, and composition that is capable of wrapping ingredients can be used.

However, in a case where a foodstuff workpiece is anisotropic in terms of properties such as shape, care is required to be taken in the orientation of the foodstuff workpiece. For example, in a case of spring rolls, it is necessary to fold the predetermined parts of a foodstuff workpiece taking a predetermined posture in a predetermined order. On the other hand, in a food production apparatus, a foodstuff workpiece is not necessarily conveyed in a posture suitable for folding from the beginning. If the posture of a foodstuff workpiece is not suitable for folding, the posture of the foodstuff workpiece is adjusted by rotating the foodstuff workpiece to have an orientation suitable for folding.

Figure 2:
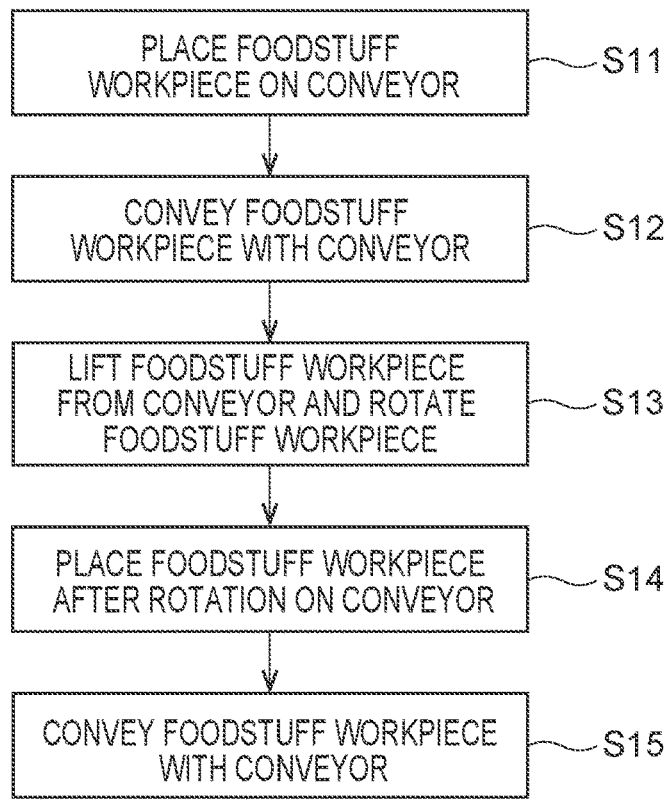
FIG. 2 is a flowchart showing an example of a rotation method which rotates a foodstuff workpiece.

FIG. 2 is a flowchart showing an example of a rotation method of rotating a foodstuff workpiece.

First, a foodstuff workpiece of a desired shape and a desired size is placed on a conveyor (S11 in FIG. 2), and the foodstuff workpiece is conveyed downstream by the conveyor (S12). On this occasion, the orientation of a foodstuff workpiece placed on the conveyor is mainly determined according to the specifications of a supply device (a foodstuff workpiece supply unit) that supplies foodstuff workpieces on the conveyor, and in the present example, is different from an orientation suitable for the food processing treatment performed in a later stage.

Therefore, by a rotation machine, the foodstuff workpiece is lifted from the conveyor, and the foodstuff workpiece in a lifted state is rotated (S13). As a result, the posture of the foodstuff workpiece is adjusted in such a manner that the foodstuff workpiece has an orientation suitable for the food processing treatment in a later stage. The rotated foodstuff workpiece with a posture suitable for the food processing treatment is then placed on the conveyor again (S14) and conveyed by the conveyor to the later stage (S15). In lifting a foodstuff workpiece from the conveyor (S13) and in placing a foodstuff workpiece on the conveyor again (S14), the conveyor may continue to travel or stop traveling. However, from the viewpoint of preventing the interruption of processing in stages before and after the section where the rotation processing of a foodstuff workpiece is performed, it is preferable that the conveyor continue to travel regardless of whether the rotation processing of a foodstuff workpiece is performed or not.

Next, a configuration example of a food production apparatus capable of implementing the above-mentioned food production method and rotation method will be described.

Figure 3:
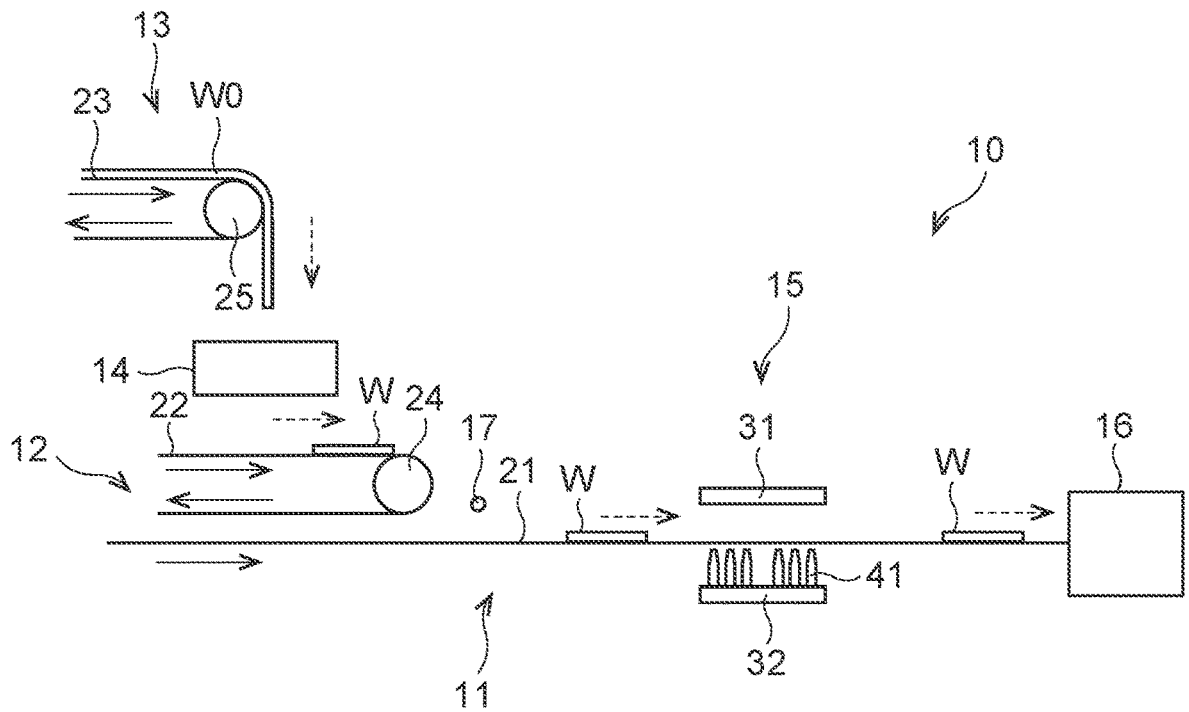
FIG. 3 is a diagram showing an example of a food production apparatus.

FIG. 3 shows an example of a food production apparatus 10. In FIG. 3, a schematic configuration of each element is shown and the illustration of the specific configuration is omitted. The elements shown in FIG. 3 include elements that are shown in sizes different from their actual sizes. The solid arrows shown in FIG. 3 indicate the directions of movement of conveyors (in particular, conveyance sections), and the dotted arrows indicate the directions of the conveyance of foodstuffs (specifically, a dough W0 and foodstuff workpieces W).

The food production apparatus 10 shown in FIG. 3 comprises a first conveyor 11, a second conveyor 12 and a third conveyor 13 as conveyors conveying foodstuffs.

The third conveyor 13 conveys a dough W0 toward the downstream side. The portion of the dough W0 that is released from the third conveyor 13 is placed in a state of hanging down from the third conveyor 13 toward a cutting unit 14.

The method of supplying a dough W0 to the third conveyor 13 is not limited. For example, a dough W0 may be directly supplied to the third conveyor 13 from a device that produces the dough W0, or a pre-made dough W0 may be supplied to the third conveyor 13. The third conveyor 13 can typically comprise a so-called net conveyor (i.e., a mesh conveyor), and a third conveyor transfer section 23 of the third conveyor 13 which travels with a dough W0 placed thereon, can be configured by a net-shaped member such as wire mesh. The third conveyor transfer section 23 shown in the figure has an endless shape, is supported by a third conveyor roller 25, and travels according to the rotation of the third conveyor roller 25.

The cutting unit 14, which is installed below the third conveyor 13, works as a foodstuff workpiece supply unit that sends out a foodstuff workpiece W. Specifically, the cutting unit 14 cuts a dough W0 supplied from the third conveyor 13 to produce a foodstuff workpiece W and sends out the foodstuff workpiece W toward the second conveyor 12. The cutting unit 14 may employ any cutting mechanism capable of cutting out a foodstuff workpiece W of a desired shape and a desired size from a dough W0. Typically, a dough W0 can be cut out by pressing a cutter included in the cutting unit 14 against the dough W0, but the cutting unit 14 may cut a dough W0 with non-physical means.

The cutting unit 14 may cut a dough W0 regularly at a predetermined timing or may cut a dough W0 under the control of a control unit (see FIG. 8) according to the amount of dough W0 supplied to the cutting unit 14. The amount of dough W0 supplied to the cutting unit 14 can be determined in any way. For example, a sensor that detects the amount of dough W0 supplied to the cutting unit 14 and transmits the detection results to the control unit may be installed in the cutting unit 14 itself or may be installed on an upstream side from the cutting unit 14. Alternatively, the control unit may obtain the amount of dough W0 supplied to the cutting unit 14 based on the conveyance amount or the conveyance speed of a dough W0 by the third conveyor 13 (for example, the traveling distance or the traveling speed of the third conveyor transfer section 23).

The second conveyor 12, which is provided below the cutting unit 14, includes a second conveyor transfer section 22. The second conveyor transfer section 22 receives from above a foodstuff workpiece W delivered from the cutting unit 14, releases the foodstuff workpiece W downward, and finally delivers the foodstuff workpiece W to the first conveyor 11 (in particular, a plurality of string-shaped members 21).

The second conveyor 12, which is installed between the cutting unit 14 and the first conveyor 11 with respect to the height direction, has the role of preventing the posture of a foodstuff workpiece W delivered from the cutting unit 14 from being disturbed. Therefore, the second conveyor transfer section 22 has a configuration capable of receiving a foodstuff workpiece W delivered from the cutting unit 14 and conveying the foodstuff workpiece W toward the downstream side in a proper manner, and can be typically configured by a belt member.

In the present embodiment, with respect to per unit length in the conveyance direction of a foodstuff workpiece W, the contact area between a foodstuff workpiece W placed on the second conveyor transfer section 22 and the second conveyor transfer section 22 is larger than the contact area between a foodstuff workpiece W placed on the plurality of string-shaped members 21 of the first conveyor 11 and the plurality of string-shaped members 21. Further, the distance between the second conveyor transfer section 22 and the plurality of string-shaped members 21 is set to a distance such that, in a state where a part of a foodstuff workpiece W is placed on the second conveyor transfer section 22, other part of the foodstuff workpiece W lands on the plurality of string-shaped members 21. According to the second conveyor transfer section 22 that satisfies these conditions, the postural disorder of a foodstuff workpiece W released from the cutting unit 14 can be suppressed, compared to a case where a foodstuff workpiece W directly delivered from the cutting unit 14 to the first conveyor 11 (i.e., the plurality of string-shaped members 21).

The food production apparatus 10 shown in FIG. 3 further comprises a roll-up prevention unit 17 to prevent the disorder of a foodstuff workpiece W delivered from the second conveyor transfer section 22 to the plurality of string-shaped members 21 (in particular, the roll-up (jumping up) of the rear end in the conveyance direction of a foodstuff workpiece W). A foodstuff workpiece W might be rolled up when being released from the cutting unit 14 or might be bounced up due to the momentum during the transfer from the second conveyor transfer section 22 to the first conveyor 11. In these cases, a foodstuff workpiece W might be accidentally bent and the tail part of the foodstuff workpiece W might overlap another part of the foodstuff workpiece W. The roll-up prevention unit 17 is provided to prevent such unintentional bending of a foodstuff workpiece W.

The roll-up prevention unit 17 shown in FIG. 3 includes a bar-shaped member extending in a horizontal direction perpendicular to the conveyance direction of a foodstuff workpiece W. A foodstuff workpiece W released from the second conveyor transfer section 22 passes between the roll-up prevention unit 17 and the plurality of string-shaped members 21. If a foodstuff workpiece W is bent when moving from the second conveyor transfer section 22 to the first conveyor 11, the tail part of the foodstuff workpiece W might roll up and cover the roll-up prevention unit 17 from above. In this case, a portion of the foodstuff workpiece W other than the tail part passes between the first conveyor 11 and the roll-up prevention unit 17, and thus the tail part of the foodstuff workpiece W also eventually passes between the first conveyor 11 and the roll-up prevention unit 17. By installing such a roll-up prevention unit 17, even a flexible foodstuff workpiece W that is easily bent can be properly placed on the plurality of string-shaped members 21.

The first conveyor 11, which is installed below the second conveyor 12, includes a plurality of string-shaped members 21 and conveys a foodstuff workpiece W, which is delivered from the second conveyor 12, toward a rotation machine 15 and a food processing machine 16. The plurality of string-shaped members 21 are horizontally separated from each other, and a space is formed between adjacent string-shaped members 21. FIG. 3 shows the first conveyor 11 (the string-shaped members 21) in a simplified manner. A specific example of the first conveyor 11 will be described later.

In the example shown in FIG. 3, the whole of all the string-shaped members 21 included in the first conveyor 11 are provided below the second conveyor transfer section 22 of the second conveyor 12, but the string-shaped members 21 are not limited to this. For example, some string-shaped members 21 (in particular, a portion of the string-shaped members 21 that corresponds to the second conveyor transfer section 22 with respect to the conveyance direction of a foodstuff workpiece W) may be located at the same height or almost the same height as the second conveyor transfer section 22 (in particular, the downstream part). In this case, the delivery of a foodstuff workpiece W from the second conveyor transfer section 22 to string-shaped members 21 can be carried out smoothly and stably, so that the disorder of the foodstuff workpiece W during this delivery can be effectively prevented.

In a cross-section (i.e., a cross-section forming a right angle with the traveling direction) of each string-shaped member 21, the size in a lateral direction (e.g., a horizontal direction) is equal to or less than the size in the longitudinal direction (e.g., the height direction), and preferably is less than the size in the longitudinal direction. The shape of the cross-section (in particular, the cross-section forming a right angle with the traveling direction) of each string-shaped member 21 is not limited, and each string-shaped member 21 may have a cross-section of a polygonal shape, a circular shape (e.g., a true circular shape or an elliptical shape) or another shaped. If the upper surface of each string-shaped member 21 (in particular, the surface that a foodstuff workpiece W contacts) is a smooth surface, as in the case where each string-shaped member 21 has a circular cross-section, it is possible to effectively prevent a large localized force from acting on the foodstuff workpiece W from each string-shaped member 21.

Figure 8:
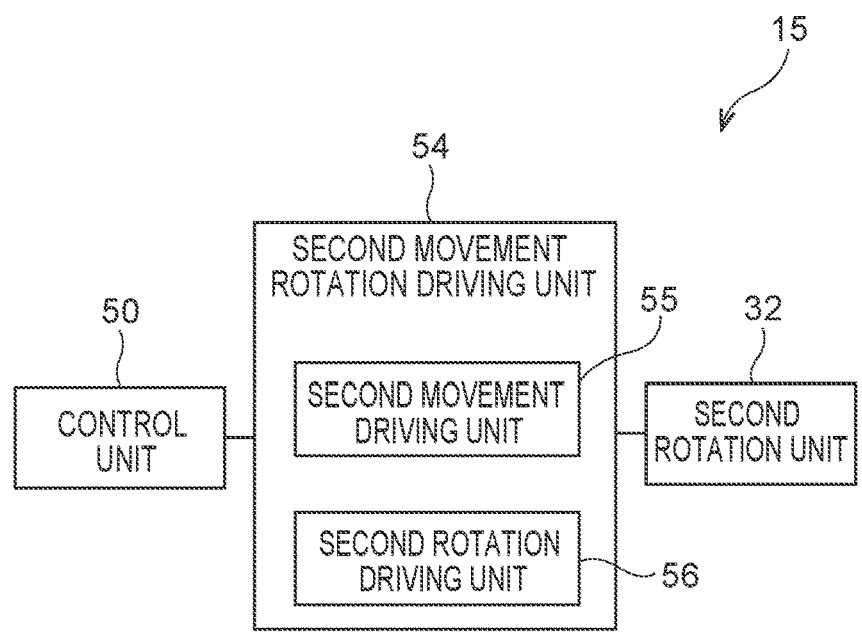
FIG. 8 is a block diagram showing a functional configuration of a control unit and the rotation machine according to the first embodiment.

The rotation machine 15 rotates a foodstuff workpiece W under the control of the control unit (see FIG. 8). Specifically, the rotation machine 15 lifts a foodstuff workpiece W from the plurality of string-shaped members 21 of the first conveyor 11, rotates the foodstuff workpiece W, and places the foodstuff workpiece W after rotation on the plurality of string-shaped members 21 again. A foodstuff workpiece W extending in the horizontal direction is rotated, by the rotation machine 15, around an axis extending along the height direction. Examples of the specific configuration of the rotation machine 15 will be described later.

The food processing machine 16, which is provided downstream from the rotation machine 15, receives a foodstuff workpiece W after the orientation of the foodstuff workpiece W has been adjusted by the rotation machine 15, and performs a food processing using the foodstuff workpiece W. The food processing machine 16 of the present embodiment wraps ingredients with a foodstuff workpiece W to make a spring roll as described above. The food processing machine 16 may have any configuration, and its detailed description and illustration are omitted. The configuration and the action of the food processing machine 16 are not limited and the food processing machine 16 may have an appropriate configuration according to a food product to be actually produced.

Next, specific examples of the rotation machine 15 and the method of rotating a foodstuff workpiece W will be described.

First Embodiment

Figure 4:
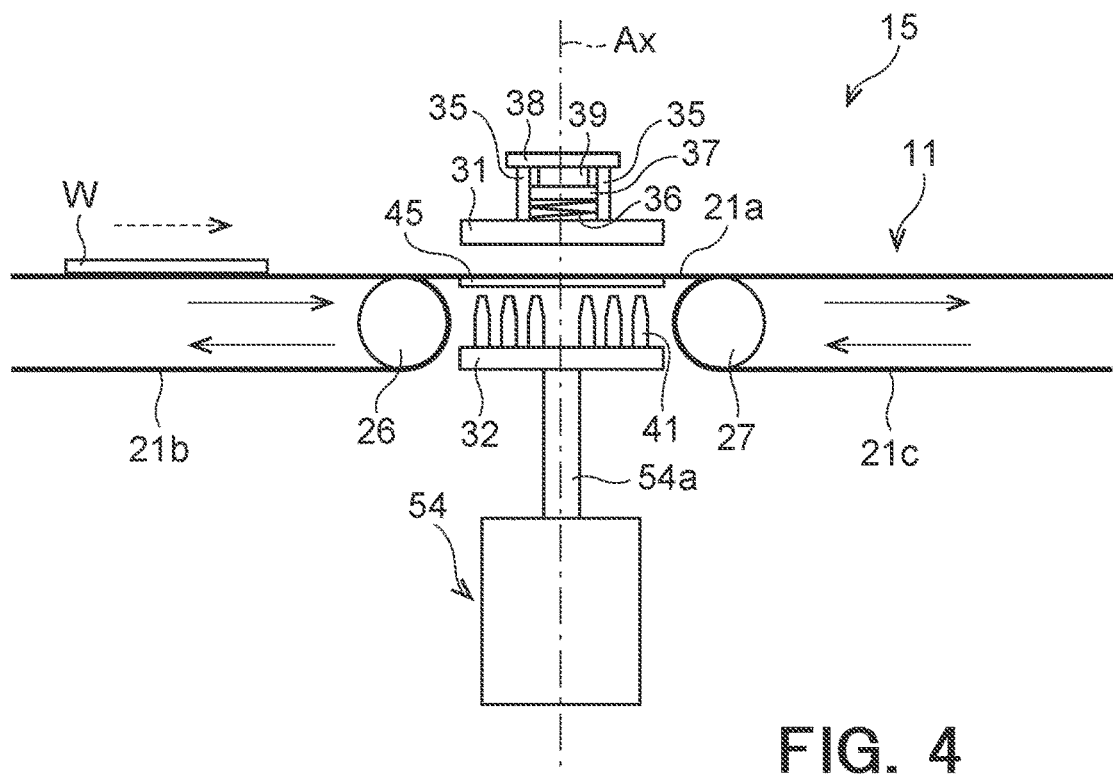
FIG. 4 is a side view showing a rotation machine according to a first embodiment.
Figure 5:
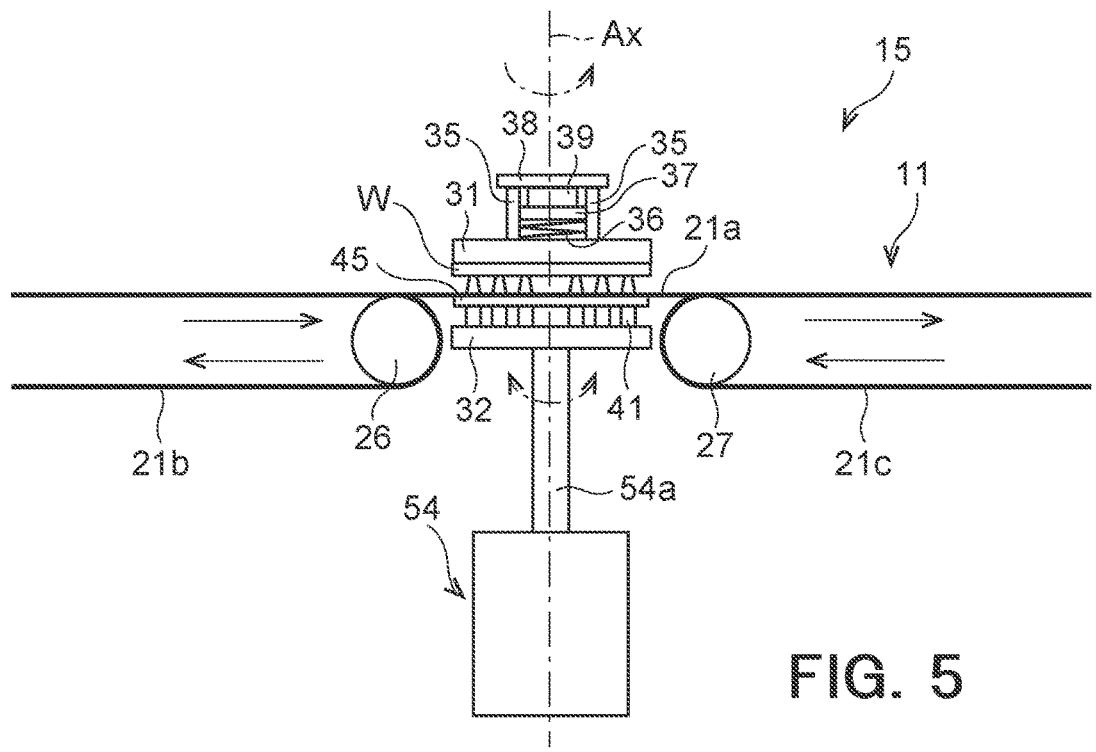
FIG. 5 is a side view showing the rotation machine according to the first embodiment.
Figure 6:
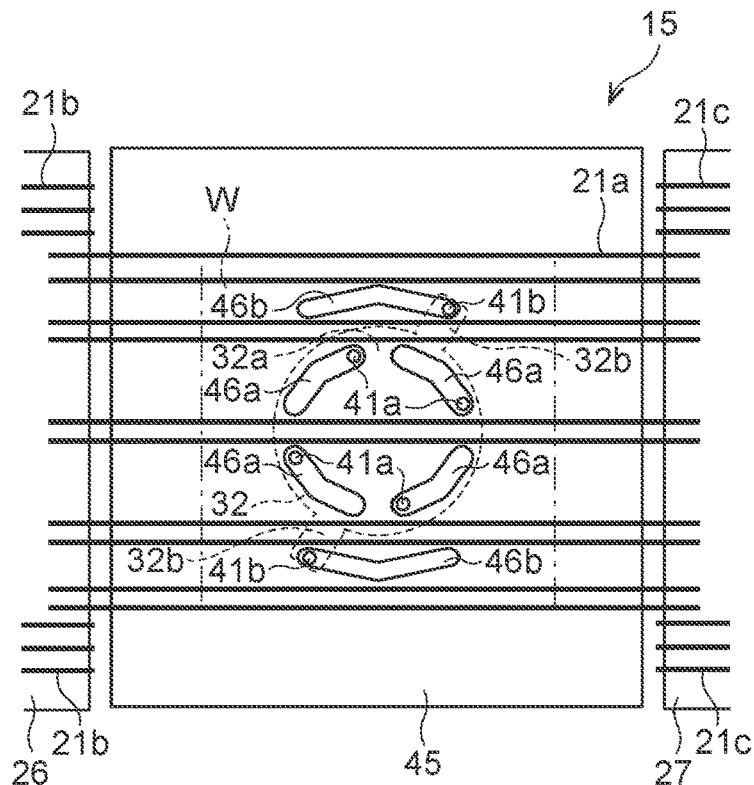
FIG. 6 is a plan view showing the rotation machine according to the first embodiment.
Figure 7:
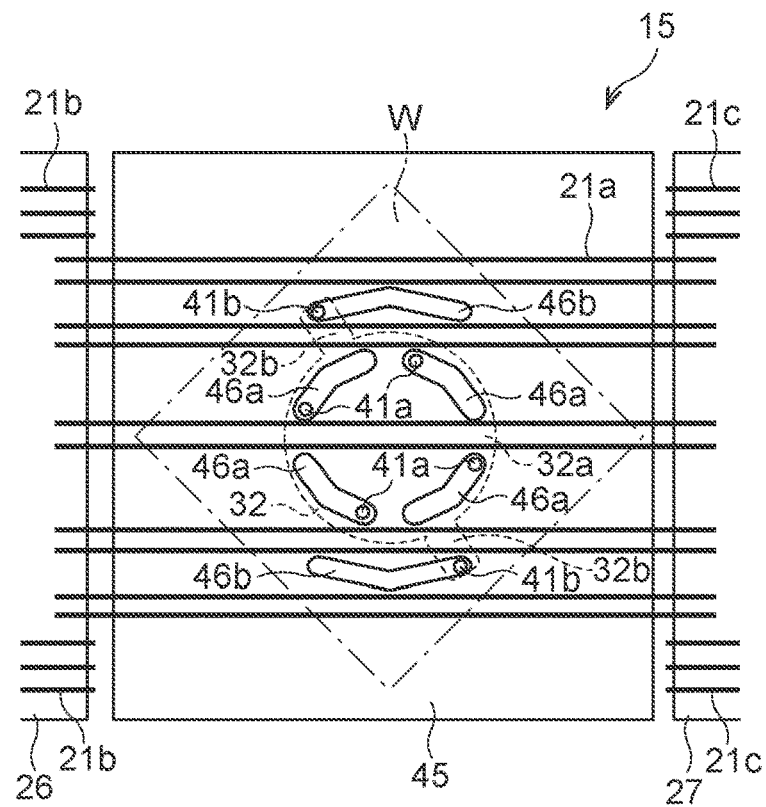
FIG. 7 is a plan view showing the rotation machine according to the first embodiment.

FIGS. 4 and 5 are side views of a rotation machine 15 according to a first embodiment. FIGS. 6 and 7 show plan views of the rotation machine 15 according to the first embodiment. FIG. 8 is a block diagram showing a functional configuration of a control unit 50 and the rotation machine 15 according to the first embodiment.

The rotation machine 15 of the present embodiment includes a first rotation unit 31 and a second rotation unit 32. At least a part of the first rotation unit 31 (in the example shown in the drawings, the whole of the first rotation unit 31) is located above the first conveyor 11 (in particular, the plurality of string-shaped members 21). The first rotation unit 31 is formed by a disk-shaped member having a cross-section of a true circle shape, and the lower surface of the first rotation unit 31 is formed by a plane that extends uniformly in the horizontal direction. The second rotation unit 32 is provided at a position facing the first rotation unit 31 in the height direction and includes a plurality of protrusion portions 41 extending toward the first rotation unit 31.

The first rotation unit 31 is provided to be passively rotatable, and the second rotation unit 32 is provided to be actively rotatable. In other words, the first rotation unit 31 cannot rotate independently without receiving external force but can rotate around the rotation axis Ax by receiving external force. The second rotation unit 32 is connected to a second movement rotation driving unit 54 and can be rotated around the rotation axis Ax independently by the power transmitted from the second movement rotation driving unit 54 without receiving external force.

The first rotation unit 31 of the present embodiment is supported by lifting-lowering guides 35 to be movable in the height direction. On the other hand, a first lifting-lowering elastic member 36 is provided between an elastic stopper 37 and the first rotation unit 31, and by the first lifting-lowering elastic member 36 being compressed between the elastic stopper 37 and the first rotation unit 31, the first rotation unit 31 receives a downward elastic force from the first lifting-lowering elastic member 36. The first lifting-lowering elastic member 36 may always be compressed between the first rotation unit 31 and the elastic stopper 37 or may be placed in either a compressed state or an uncompressed state depending on the height direction position of the first rotation unit 31. The lifting-lowering guides 35 are fixed to a passive rotation unit 38. The elastic stopper 37 is fixed to the passive rotation unit 38 via a support shaft 39. Therefore, during the first rotation unit 31 being not receiving any force from below, the first rotation unit 31 is positioned relatively downward under the influence of gravity (see FIG. 4). On the other hand, when the first rotation unit 31 receives a force from below as the second rotation unit 32 moves upward as described below (see FIG. 5), the first rotation unit 31 moves upward along the lifting-lowering guides 35 to prevent excessive force from acting on a member sandwiched between the first rotation unit 31 and the second rotation unit 32 (i.e., on a foodstuff workpiece W).

The passive rotation unit 38 is provided to be rotatable around the rotation axis Ax and rotates passively in response to, for example, the force received by the first rotation unit 31. The passive rotation unit 38 shown in the drawings can rotate only in one direction and specifically can rotate only in the same direction as the direction in which the second rotation unit 32 rotates a foodstuff workpiece W. The specific configuration of the passive rotation unit 38 is not limited and may have any configuration.

The second rotation unit 32 of the present embodiment is fixed to the second movement rotation shaft 54a of the second movement rotation driving unit 54. The second movement rotation shaft 54a is rotatable around the rotation axis Ax and can change the amount of protrusion in the height direction from the main body part of the second movement rotation driving unit 54. Therefore, the second movement rotation driving unit 54 performs both the rotation driving and the movement driving of the second rotation unit 32 under the control of the control unit 50. In other words, the second movement rotation driving unit 54 functionally includes: a second movement driving unit 55 for moving the second rotation unit 32; and a second rotation driving unit 56 for rotating the second rotation unit 32.

The second movement rotation driving unit 54 may have any configuration that functions as the second movement driving unit 55 and the second rotation driving unit 56. For example, a device that works as the second movement driving unit 55 and a device that works as the second rotation driving unit 56 may be provided separately and both the devices may be connected to each other to form the second movement rotation driving unit 54. Alternatively, the second movement driving unit 55 and the second rotation driving unit 56 may be realized by a common device that is inseparable. The movement of the second rotation unit 32 and the rotation of the second rotation unit 32 performed by the second movement rotation driving unit 54 can be performed independently of each other. Thus, the second movement rotation driving unit 54, which functions as the second movement driving unit 55 and the second rotation driving unit 56, can be realized by known elements (for example, a ball screw, an air cylinder, or a motor, etc.) and can be also realized by using an NB ball bearing (a SPBR type, a SPBF type) manufactured by NIPPON BEARING CO., LTD.

The plurality of protrusion portions 41 that the second rotation unit 32 has includes: two or more inner protrusion portions 41a that are provided relatively close to the rotation axis Ax of the second rotation unit 32; and one or more outer protrusion portions 41b that are provided relatively far apart from the rotation axis Ax of the second rotation unit 32 (see FIGS. 6 and 7). The second rotation unit 32 shown in the drawings has six protrusion portions 41 including four inner protrusion portions 41a and two outer protrusion portions 41b. In the example shown in the drawings, the four inner protrusion portions 41a are fixed to a disk-shaped portion 32a having a circular cross-section of the main body part of the second rotation unit 32, and the two outer protrusion portions 41b are fixed to two extension portions 32b of the main body part of the second rotation unit 32 that protrude horizontally outward from the disk-shaped portion 32a. These inner protrusion portions 41a are arranged at equal angular intervals around the rotation axis Ax, and these outer protrusion portions 41b are also arranged at equal angular intervals around the rotation axis Ax. In the example shown in the drawings, the angle around the rotation axis Ax formed by adjacent inner protrusion portions 41a is 90 degrees (=360 degrees/4), and the angle around the rotation axis Ax formed by adjacent outer protrusion portions 41b is 180 degrees (=360 degrees/2). In this manner, it is preferable that the plurality of inner protrusion portions 41a that the second rotation unit 32 has be provided at rotationally symmetrical positions around the rotation axis Ax. Further, it is preferable that the plurality of outer protrusion portions 41b that the second rotation unit 32 has also be provided at rotationally symmetrical positions around the rotation axis Ax. Furthermore, it is preferable that the plurality of protrusion portions 41 that the second rotation unit 32 has be provided in rotationally symmetrical positions around the rotation axis Ax, as a whole.

The plurality of string-shaped members 21 are classified into first string-shaped members 21a, second string-shaped members 21b, and third string-shaped members 21c. The first string-shaped members 21a are string-shaped members 21 that travel to pass through the rotation machine 15, and in the present embodiment, travel from an area situated upstream from the rotation machine 15, to an area situated downstream from the rotation machine 15. The second string-shaped members 21b are string-shaped members 21 that travel in an area situated upstream from the rotation machine 15. The third string-shaped members 21c are string-shaped members 21 that travel in an area situated downstream from the rotation machine 15. The second string-shaped members 21b are supported by a first return roller 26, which is installed upstream from the rotation machine 15, and are reversed on this first return roller 26. The third string-shaped members 21c are supported by a second return roller 27, which is installed downstream from the rotation machine 15, and are reversed on this second return roller 27. The first string-shaped members 21a travel parallel to the second string-shaped members 21b in an area situated upstream from the rotation machine 15, travel parallel to the third string-shaped members 21c in an area situated downstream from the rotation machine 15, and travel in an area corresponding to the rotation machine 15 (for example, an area between the first rotation unit 31 and the second rotation unit 32) while being supported from below by a guide plate 45.

The first string-shaped members 21a travel so as to pass above the guide plate 45 while the second string-shaped members 21b and the third string-shaped members 21c travel only an area situated upstream from the guide plate 45 and only an area situated downstream from the guide plate 45, respectively. Therefore, above the guide plate 45, in terms of the horizontal direction forming a right angle with respect to the traveling direction of the string-shaped members 21, string-shaped members 21 (i.e., the first string-shaped members 21a) travel only in a space corresponding to the central part of the guide plate 45 and no string-shaped members 21 are present in spaces corresponding to both end parts of the guide plate 45. In this manner, since no string-shaped members 21 are provided in both end part sides in terms of the horizontal direction forming a right angle with respect to the traveling direction of the string-shaped members 21, it is possible to prevent end parts (for example, corner parts) of a foodstuff workpiece W from getting caught on string-shaped members 21 while the foodstuff workpiece W is rotated above the guide plate 45, which makes it possible to rotate the foodstuff workpiece W in a stable manner. In particular, if, of a foodstuff workpiece W, "an end part which is rotated in a direction containing a directional component opposite to the traveling direction of the string-shaped members 21" is unintentionally got caught on string-shaped members 21, the end part of the foodstuff workpiece W receives from the string-shaped members 21 a frictional force acting in a direction opposite to the rotation direction and thus be easily disturbed. According to the string-shaped members 21 of the present embodiment described above (i.e., the first string-shaped members 21a, the second string-shaped members 21b and the third string-shaped members 21a), such disturbance of end parts of a foodstuff workpiece W can be effectively avoided.

The guide plate 45 is provided in a fixed manner while being supported by a support unit, which is not shown in the drawings, and supports the first string-shaped members 21a from below in such a manner that the first string-shaped members 21a can travel freely. The guide plate 45 of the present embodiment includes: a plurality of inner movement holes 46a provided at positions corresponding to the respective inner protrusion portions 41a; and a plurality of outer movement holes 46b provided at positions corresponding to the respective outer protrusion portions 41b. Each inner movement hole 46a is penetrated by a corresponding inner protrusion portion 41a when the second rotation unit 32 is arranged in a lifted position (see FIG. 5), and is provided in an area over a range including the rotation path of the corresponding inner protrusion portion 41a so as not to inhibit the rotation of the corresponding inner protrusion portion 41a. Likewise, each outer movement hole 46b is penetrated by a corresponding outer protrusion portion 41b when the second rotation unit 32 is arranged in the lifted position, and is provided in an area over a range including the rotation path of the corresponding outer protrusion portion 41b so as not to inhibit the rotation of the corresponding outer protrusion portion 41b. In the example shown in the drawings, separate inner movement holes 46a and outer movement holes 46b are provided with respect to the respective inner protrusion portions 41a and outer protrusion portions 41b. However, one common movement hole may be provided for two or more of the inner protrusion portions 41a and the outer protrusion portions 41b.

The control unit 50 of the present embodiment controls the rotation machine 15 (in particular, the movement and rotation of the second rotation unit 32) having the above-mentioned configuration to rotate each foodstuff workpiece W as mentioned below.

First, the control unit 50 controls the second movement rotation driving unit 54 in such a manner that the protrusion amount of the second movement rotation shaft 54a from the main body part is adjusted to a first protrusion amount and the position in the rotation direction of the second movement rotation shaft 54a is adjusted to a first rotation position. As a result, the second rotation unit 32 is arranged in a first height direction position, and the plurality of protrusion portions 41 of the second rotation unit 32 are positioned below the first string-shaped members 21a (in the example shown in FIG. 4, below the guide plate 45). Further, the plurality of protrusion portions 41 are arranged in the first rotation position (see the inner protrusion portions 41a and the outer protrusion portions 41b shown in FIG. 6).

Then, the control unit 50 controls the second movement rotation driving unit 54 in such a manner that the amount of protrusion of the second movement rotation shaft 54a from the main body part is adjusted to a second protrusion amount larger than the first protrusion amount, according to a timing at which a foodstuff workpiece W conveyed by the first conveyor 11 is positioned between the first rotation unit 31 and the second rotation unit 32. As a result, the second rotation unit 32 moves upward in such a manner that the plurality of protrusion portions 41 penetrate between string-shaped members 21 of the first conveyor 11 (in particular, between the first string-shaped members 21a) and lift a foodstuff workpiece W from the string-shaped members 21 of the first conveyor 11, and is arranged in a second height direction position (see FIG. 5). As a result, the foodstuff workpiece W is sandwiched and held by the first rotation unit 31 and the second rotation unit 32 (in particular, the plurality of protrusion portions 41).

Then, the control unit 50 controls the second movement rotation driving unit 54 to rotate the second movement rotation shaft 54a and arrange the second movement rotation shaft 54a in a second rotation position in a state where the foodstuff workpiece W is held by the first rotation unit 31 and the second rotation unit 32. As a result, the plurality of protrusion portions 41 of the second rotation unit 32 are rotated from the first rotation position and are arranged in the second rotation position (see the inner protrusion portions 41a and the outer protrusion portions 41b shown in FIG. 7). On this occasion, the first rotation unit 31 receives a force in a rotation direction from the second rotation unit 32 via the foodstuff workpiece W and is thereby rotated in the same direction as the second rotation unit 32. Thus, the foodstuff workpiece W is rotated around the rotation axis Ax together with the first rotation unit 31 and the second rotation unit 32 in a state of being sandwiched and held by the first rotation unit 31 and the second rotation unit 32 (in particular, the plurality of protrusion portions 41).

Then, the control unit 50 controls the second movement rotation driving unit 54 to adjust the amount of protrusion of the second movement rotation shaft 54a from the main body part to the first protrusion amount. On this occasion, the rotation direction position of the second movement rotation shaft 54a is maintained at the second rotation position. As a result, the second rotation unit 32 is moved downward in a state of being arranged in the second rotation position, and the plurality of protrusion portions 41 are positioned below the first string-shaped members 21a. The foodstuff workpiece W is released from the first rotation unit 31 by the second rotation unit 32 descending and is released from the second rotation unit 32 by being placed on the first conveyor 11 (in particular, on the first string-shaped members 21a).

By performing the series of processes described above, a foodstuff workpiece W is rotated by the rotation machine 15 (see FIGS. 6 and 7). A foodstuff workpiece W after rotation is conveyed while being placed on the plurality of first string-shaped members 21a, and in an area downstream from the rotation machine 15, is conveyed while being placed on the first string-shaped members 21a and the third string-shaped members 21c to be supplied to the food processing machine 16.

As explained above, according to the present embodiment, a foodstuff workpiece W is rotated in a state of being supported by the inner protrusion portions 41a and the outer protrusion portions 41b, which have different distances from the rotation axis Ax. This makes it possible for a foodstuff workpiece W to be accurately rotated while the foodstuff workpiece W is stably held by the second rotation unit 32 (specifically, the plurality of protrusion portions 41). As described above, by providing not only the inner protrusion portions 41a but also the outer protrusion portions 41b, it is possible to rotate a foodstuff workpiece W by a desired angle in a stable and accurate manner.

In particular, by supporting the outer periphery part of a foodstuff workpiece W, which tends to hang down, with the outer protrusion portions 41b and by arranging the outer periphery part at a position which is sufficiently distanced from string-shaped members 21 (in particular, the first string-shaped members 21a), the foodstuff workpiece W can be stably and accurately rotated by a desired angle. If the outer periphery part of a foodstuff workpiece W is in contact with string-shaped members 21 when the rotation machine 15 rotates the foodstuff workpiece W, the rotational accuracy of the foodstuff workpiece W deteriorates due to a frictional force acting on the outer periphery part from the string-shaped members 21, and the outer periphery part could be twisted or damaged depending on circumstances. In particular, in a case where a foodstuff workpiece W is conveyed by a plurality of string-shaped members 21 with a relatively large gap ratio, such unintended twisting or damage of the foodstuff workpiece W is likely to occur. Therefore, by installing the outer protrusion portions 41b in the device that conveys a foodstuff workpiece W by string-shaped members 21 as in the present embodiment, it is possible to prevent deterioration of the rotational accuracy of the foodstuff workpiece W and to prevent twisting and damage of the foodstuff workpiece W.

If a foodstuff workpiece W has a relatively large horizontal extent but only the outer periphery part of the foodstuff workpiece W is supported by protrusion portions, the foodstuff workpiece W could be rotated in a state where the center portion of the foodstuff workpiece W is loose and in contact with string-shaped members 21. In this case, there are concerns that the foodstuff workpiece W cannot be rotated accurately or that the foodstuff workpiece W might be twisted or damaged. On the other hand, according to the present embodiment, since the center portion of a foodstuff workpiece W is supported by the inner protrusion portions 41a, it is possible to prevent the foodstuff workpiece W from being rotated in a state where the center portion of the foodstuff workpiece W is in contact with string-shaped members 21.

Further, a foodstuff workpiece W is rotated, by the second rotation unit 32 which moves upward, in a state of being lifted from below. This makes it possible to accurately rotate a foodstuff workpiece W while a force (a frictional force) received by the foodstuff workpiece W from the first conveyor 11 is reduced, even if at least a part of the foodstuff workpiece W is in contact with the first conveyor 11 in rotating the foodstuff workpiece W. When a foodstuff workpiece W that has been completely lifted entirely from the first conveyor 11 (specifically, from the first string-shaped members 21a) is rotated while being sandwiched between the first rotation unit 31 and the second rotation unit 32, the foodstuff workpiece W can be rotated with higher precision without receiving any force (frictional force) from the first conveyor 11. Further, since it is not necessary to stop the first conveyor 11 (i.e., the first string-shaped members 21a) in order for a foodstuff workpiece W to be rotated, it is possible to rotate a foodstuff workpiece W without causing significant adverse effects on devices and processing upstream and downstream from the rotation machine 15.

Further, since the plurality of protrusion portions 41 that the second rotation unit 32 has include the inner protrusion portions 41a and the outer protrusion portions 41b, it is also possible to rotate various types of foodstuff workpieces W of different shapes and/or different sizes without deteriorating accuracy.

Further, the configuration of conveying a foodstuff workpiece W using a plurality of string-shaped members 21 is excellent in terms of convenience in performing various processes on the foodstuff workpiece W. For example, in a case where a foodstuff workpiece W is bent in the food processing machine 16 as in the present embodiment, it is possible to easily bend the foodstuff workpiece W by blowing air on the foodstuff workpiece W through a gap between string-shaped members 21.

In addition, by supplying a foodstuff workpiece W from the cutting unit 14 (a foodstuff workpiece supply unit) to the first conveyor 11 via the second conveyor 12, the posture of the foodstuff workpiece W supplied to the first conveyor 11 can be stabilized. In particular, when the first conveyor 11 includes a plurality of string-shaped members 21, there may actually be a speed difference, albeit very small, between string-shaped members 21. In a case where a foodstuff workpiece W in an erect posture is supplied to a plurality of string-shaped members 21, the posture of the foodstuff workpiece W tends to be disturbed by the impact of such speed difference between string-shaped members 21. On the other hand, in a case where a foodstuff workpiece W in a posture near a horizontal posture is supplied to a plurality of string-shaped members 21, the impact of the speed difference between string-shaped members 21 on the posture of the foodstuff workpiece W is relatively small. Therefore, by supplying a foodstuff workpiece W to the plurality of string-shaped members 21 from the second conveyor transfer section 22 described above, the posture of the foodstuff workpiece W supplied to the plurality of string-shaped members 21 can be stabilized.

By improving the accuracy and the stability of rotation of a foodstuff workpiece W performed by the rotation machine 15, the accuracy and the stability of the food processing performed by the food processing machine 16 is also improved. Further, it is also possible to increase in the processing speed and improve the yield rate in the entire food production apparatus 10, and to produce good quality foods in a stable and fast manner.

The inventors actually manufactured a food production apparatus using a rotation machine based on the technology disclosed in Patent Literature 1 and a food production apparatus 10 using the rotation machine 15 of the present embodiment described above and made the comparison therebetween. As a result, the food production apparatus 10 using the rotation machine 15 of the present embodiment was able to produce foods (specifically, spring rolls) more efficiently, compared to the food production apparatus using a rotation machine based on the technology disclosed in Patent Literature 1.

Second Embodiment

In the present embodiment, elements which are the same as or similar to those in the first embodiment described above are marked with the same signs, and the detailed description thereof is omitted.

The first rotation unit 31 and the second rotation unit 32 of the rotation machine 15 of the present embodiment are both provided to be actively rotatable. Further, at least one of the first rotation unit 31 and the second rotation unit 32 is provided to be movable in such a manner that the distance between the first rotation unit 31 and the second rotation unit 32 is variable. In other words, only one or both of the first rotation unit 31 and the second rotation unit 32 are provided to be movable in such a manner that the distance between the first rotation unit 31 and the second rotation unit 32 is variable. Below, as an example, the first rotation unit 31 cannot be raised and lowered in the height direction but the second rotation unit 32 is provided to be able to be raised and lowered in the height direction.

Figure 9:
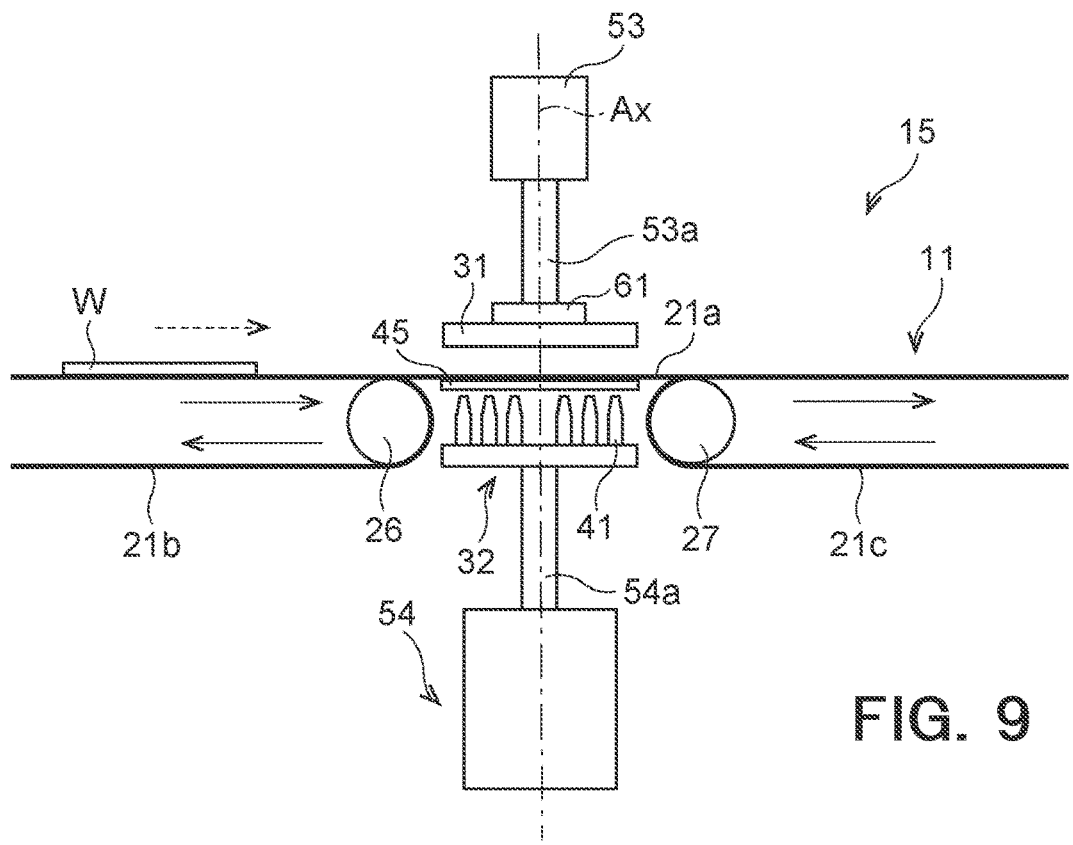
FIG. 9 is a side view showing a rotation machine according to a second embodiment.
Figure 10:
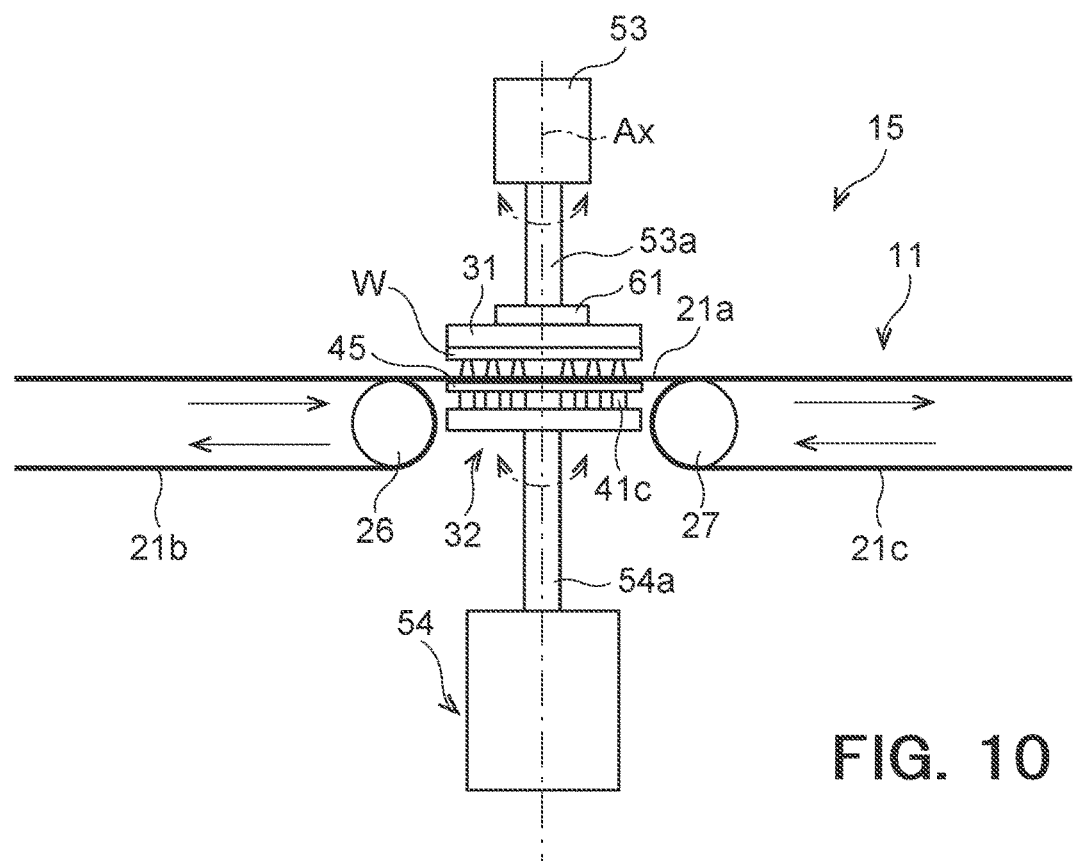
FIG. 10 is a side view showing the rotation machine according to the second embodiment.
Figure 11:
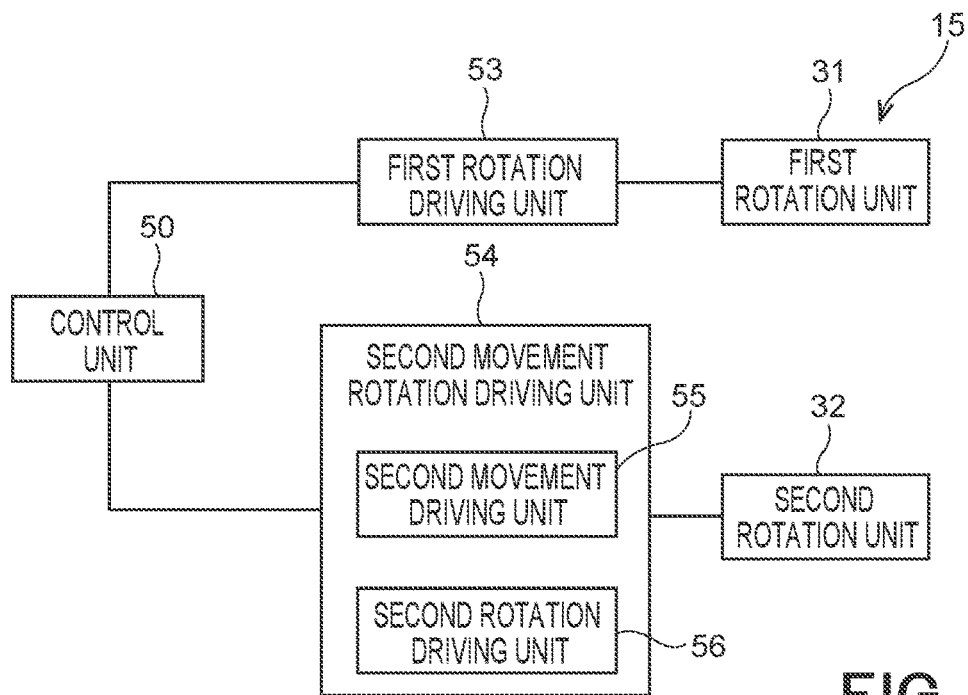
FIG. 11 is a block diagram showing a functional configuration of a control unit and the rotation machine according to the second embodiment.

FIGS. 9 and 10 are side views showing a rotation machine 15 according to a second embodiment. FIG. 11 is a block diagram showing the functional configuration of a control unit 50 and the rotation machine 15 according to the second embodiment.

The first rotation unit 31 is fixed to the first rotation shaft 53a via a second lifting-lowering elastic unit 61 and is provided to be able to rotate around the rotation axis Ax in an integrated manner with the second lifting-lowering elastic unit 61 and the first rotation shaft 53a. The second lifting-lowering elastic unit 61 is formed by a member that is elastically compressible in the height direction and, as with the first lifting-lowering elastic member 36 (see FIGS. 4 and 5) described above, prevents excessive force from acting on a member (i.e., a foodstuff workpiece W) sandwiched between the first rotation unit 31 and the second rotation unit 32. The first rotation shaft 53a of a first rotation driving unit 53 is provided to be able to rotate around the rotation axis Ax, and the first rotation driving unit 53 rotates the first rotation shaft 53a under the control of the control unit 50.

In this manner, the first rotation unit 31 can be actively rotated by the rotational power transmitted from the first rotation driving unit 53 (in particular, the first rotation shaft 53a) via the second lifting-lowering elastic unit 61.

In the present example, since the first rotation unit 31 is basically not raised and lowered in the height direction, the first rotation shaft 53a does not change the amount of protrusion in the height direction from the main body part of the first rotation driving unit 53. However, the first rotation shaft 53a may be able to change the amount of protrusion in the height direction from the main body part of the first rotation driving unit 53.

The rest of the configuration is similar to the configuration in the first embodiment described above.

The control unit 50 of the present embodiment controls the rotation machine 15 having the above-described configuration as described below (in particular, the rotation of both the first rotation unit 31 and the second rotation unit 32, and the movement of at least one of the first rotation unit 31 and the second rotation unit 32 (in the example shown in FIGS. 9 to 11, the movement of the second rotation unit 32) to rotate each foodstuff workpiece W.

First, the control unit 50 controls the second movement rotation driving unit 54 in such a manner that the protrusion amount of the second movement rotation shaft 54a from the main body part is adjusted to the first protrusion amount and that the position in the rotation direction of the second movement rotation shaft 54a is adjusted to the first rotation position. As a result, the second rotation unit 32 is arranged in the first height direction position and the plurality of protrusion portions 41 of the second rotation unit 32 are positioned below the first string-shaped members 21a (in the example shown in FIG. 9, below the guide plate 45). Further, the plurality of protrusion portions 41 are arranged in the first rotation position.

On the other hand, the position in the rotation direction of the first rotation unit 31 may or may not be adjusted under the control of the control unit 50. In a case where the first rotation unit 31 is formed by a member that is not anisotropic in terms of horizontal shape, such as a disk-shaped member having a circular cross-section, the position in the rotation direction of the first rotation unit 31 is not necessarily required to be adjusted. On the other hand, in a case where it is necessary to make a specific part of the first rotation unit 31 face the plurality of protrusion portions 41 of the second rotation unit 32, the control unit 50 controls the first rotation driving unit 53 to adjust the position in the rotation direction of the first rotation unit 31.

The control unit 50 then performs control in such a manner that at least one of the first rotation unit 31 and the second rotation unit 32 (in the present example, the second rotation unit 32) is moved to hold a foodstuff workpiece W lifted from the plurality of first string-shaped members 21a of the first conveyor 11 while being sandwiched between the first rotation unit 31 and the second rotation unit 32. Specifically, the control unit 50 controls the second movement rotation driving unit 54 to adjust the protrusion amount of the second movement rotation shaft 54a from the main body part to the second protrusion amount larger than the first protrusion amount according to a timing when a foodstuff workpiece W being conveyed by the first conveyor 1 is positioned between the first rotation unit 31 and the second rotation unit 32. As a result, the second rotation unit 32 is moved upward in such a manner that the plurality of protrusion portions 41 penetrate between string-shaped members 21 (in particular, the first string-shaped members 21a) of the first conveyor 11 and that a foodstuff workpiece W is lifted from the string-shaped members 21 of the first conveyor 11, and is arranged in the second height direction position (see FIG. 10). The foodstuff workpiece W is sandwiched and held by the first rotation unit 31 and the second rotation unit 32 (in particular, the plurality of protrusion portions 41) which is located at the second height direction position.

Further, the control unit 50 controls the first rotation driving unit 53 and the second movement rotation driving unit 54 to rotate the first rotation shaft 53a and the second movement rotation shaft 54a to be arranged in the second rotation position. On this occasion, the control unit 50 actively rotates the first rotation unit 31 and the second rotation unit 32 which are holding a foodstuff workpiece W while nipping the foodstuff workpiece W, in synchronization with each other. As a result, the first rotation unit 31 and the plurality of protrusion portions 41 of the second rotation unit 32 are rotated from the first rotation position and is arranged in the second rotation position. Hence, the foodstuff workpiece W is rotated around the rotation axis Ax together with the first rotation unit 31 and the second rotation unit 32 in a state of being sandwiched and held by the first rotation unit 31 and the second rotation unit 32 (in particular, the plurality of protrusion portions 41). In particular, since the first rotation unit 31 and the second rotation unit 32 rotate in synchronization with each other, the foodstuff workpiece W can be rotated by a desired angle reliably and accurately while the load acting on the foodstuff workpiece W from the first rotation unit 31 and the second rotation unit 32 is reduced.

The control unit 50 then perform control to cause at least one of the first rotation unit 31 and the second rotation unit 32 to move in such a manner that a foodstuff workpiece W is released from the first rotation unit 31 and the second rotation unit 32 to be placed on the first string-shaped members 21a of the first conveyor 11. The control unit 50 in the present example controls the second movement rotation driving unit 54 to adjust the protrusion amount of the second movement rotation shaft 54a from the main body part to the first protrusion amount. On this occasion, the position in the rotation direction of the second movement rotation shaft 54a is maintained at the second rotation position. As a result, the second rotation unit 32 is moved downward in a state of being arranged in the second rotation position, and the plurality of protrusion portions 41 are arranged below the first string-shaped members 21a. The foodstuff workpiece W is released from the first rotation unit 31 by the second rotation unit 32 descending, and the foodstuff workpiece W is released from the second rotation unit 32 by being placed on the first conveyor 11 (in particular, the first string-shaped members 21a).

As explained above, according to the present embodiment, a foodstuff workpiece W is rotated while being held by the first rotation unit 31 and the second rotation unit 32 (in particular, the plurality of protrusion portions 41) that synchronously rotate. Thus, the foodstuff workpiece W can be stably and accurately rotated by a desired angle.

In a case where the first rotation unit 31 does not actively rotate as in the first embodiment described above, when a foodstuff workpiece W is rotated, the first rotation unit 31 does not necessarily rotate in a similar manner to the foodstuff workpiece W and the foodstuff workpiece W might rub against the first rotation unit 31. In this case, the foodstuff workpiece W might be scraped off to produce foodstuff workpiece W shavings. The shavings of a foodstuff workpiece W thus produced adhere to the first rotation unit 31 or to the plurality of string-shaped members 21 and the second rotation unit 32 (the plurality of protrusion portions 41). If shavings of a foodstuff workpiece W are adhering to the first rotation unit 31, a foodstuff workpiece W might firmly stick to the first rotation unit 31 more than necessary, and thus there is a concern that a foodstuff workpiece W might not be properly released from the first rotation unit 31. Further, shavings of a foodstuff workpiece W adhering to the plurality of string-shaped members 21 and the second rotation unit 32 (the plurality of protrusion portions 41) can result in poor conveyance and poor rotation of a foodstuff workpiece W.

On the other hand, by synchronously rotating the first rotation unit 31 and the second rotation unit 32 as in the present embodiment, shavings of a foodstuff workpiece W are less likely to be generated, and the occurrence of various defects caused by shavings of a foodstuff workpiece W can be effectively avoided.

FIRST MODIFICATION EXAMPLE

In the first embodiment and the second embodiment described above, the first rotation unit 31 is provided to be passively movable in the height direction but cannot be actively moved in the height direction. However, the first rotation unit 31 may also be provided to be actively movable in the height direction.

Figure 12:
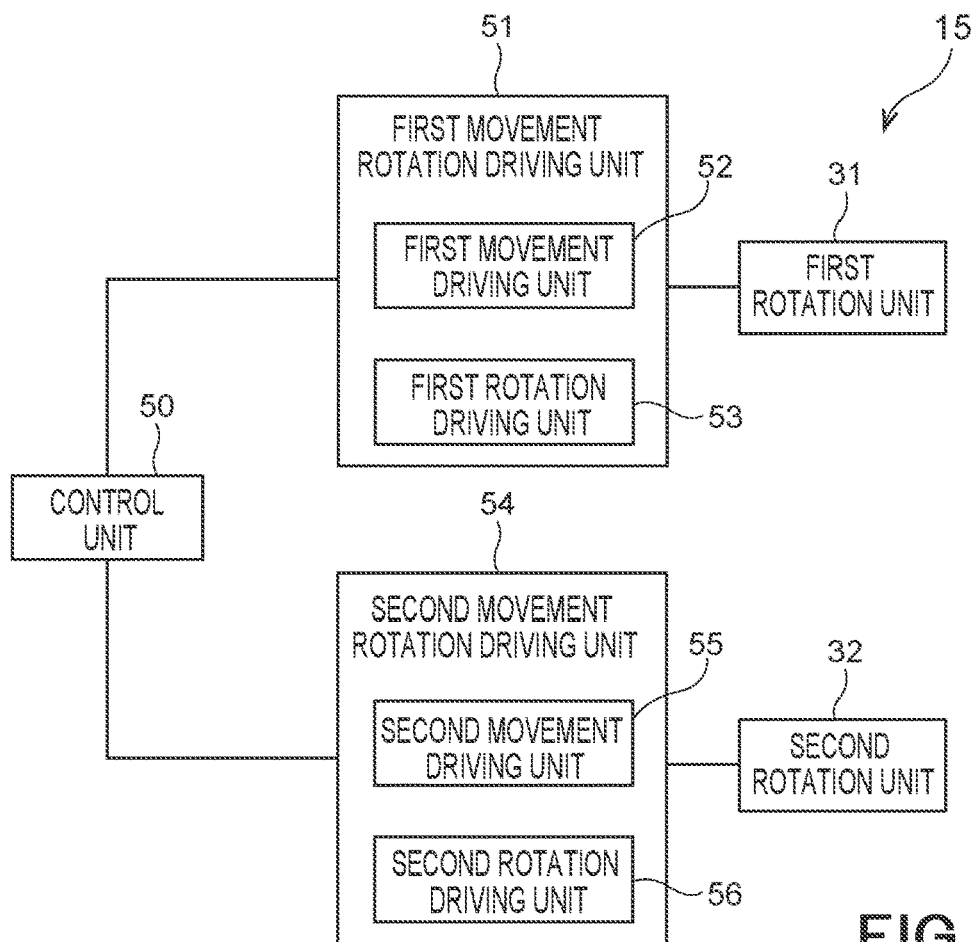
FIG. 12 is a block diagram showing a functional structure of a control unit and a rotation machine according to a first modification example.

FIG. 12 is a block diagram showing a functional structure of a control unit 50 and a rotation machine 15 according to a first modification example. The first rotation unit 31 may be connected to a first movement rotation driving unit 51, and may be independently moved in the height direction and may be independently rotated around the rotation axis Ax, without receiving external force, by the power transmitted from the first movement rotation driving unit 51 under the control of the control unit 50.

In terms of function, the first movement rotation driving unit 51 includes a first movement driving unit 52 for moving the first rotation unit 31 and a first rotation driving unit 53 for rotating the first rotation unit 31. The first movement rotation driving unit 51 may have any configuration that functions as the first movement driving unit 52 and the first rotation driving unit 53. For example, a device that acts as the first movement driving unit 52 and a device that acts as the first rotation driving unit 53 may be provided separately, and the first movement rotation driving unit 51 may be configured by connecting both those devices. Further, the first movement driving unit 52 and the first rotation driving unit 53 may by realized by a common device that is inseparable. Further, the movement of the first rotation unit 31 and the rotation of the first rotation unit 31 performed by the first movement rotation driving unit 51 can be performed independently of each other. The above-described first movement rotation driving unit 51 may have a similar configuration to the second movement rotation driving unit 54 described above, for example.

SECOND MODIFICATION EXAMPLE

The above-described first rotation unit 31 of the first embodiment and the second embodiment has a lower surface that is formed by a plane that extends uniformly in the horizontal direction, but the shape of the lower surface of the first rotation unit 31 is not limited. For example, from the viewpoint of improving the peelability of the first rotation unit 31 to a foodstuff workpiece W in order to prevent a foodstuff workpiece W from unintentionally sticking to the first rotation unit 31, it is preferable that the contact area between a foodstuff workpiece W and the first rotation unit 31 be smaller when the foodstuff workpiece W is sandwiched between the first rotation unit 31 and the second rotation unit 32.

Therefore, it is preferable that the first rotation unit 31 should have one or more projecting portions which project toward the second rotation unit 32 and face the plurality of protrusion portions 41. In this case, when a foodstuff workpiece W is sandwiched between the first rotation unit 31 and the second rotation unit 32, the foodstuff workpiece W comes into contact with the projecting portions but does not come into contact with the part of the first rotation unit 31 other than the projecting portions.

Figure 13:
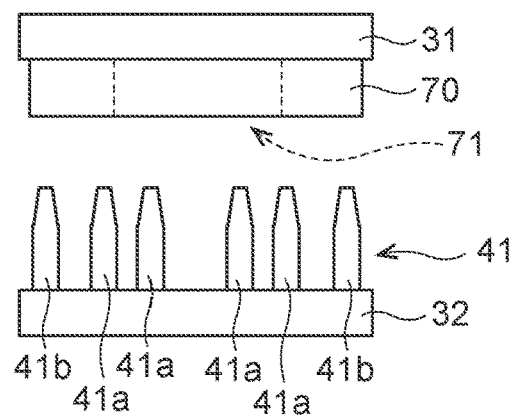
FIG. 13 is a side view showing a first example of a projecting portion which a first rotation unit includes.
Figure 14:
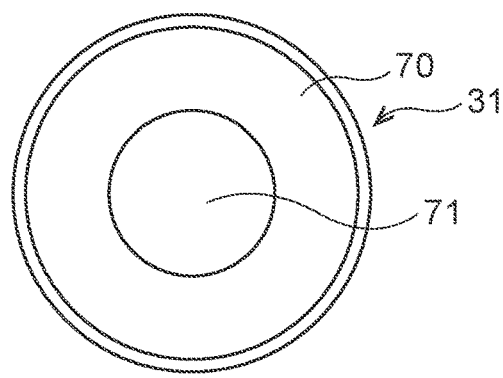
FIG. 14 is a bottom view showing the first example of the projecting portion which the first rotation unit includes.
Figure 15:
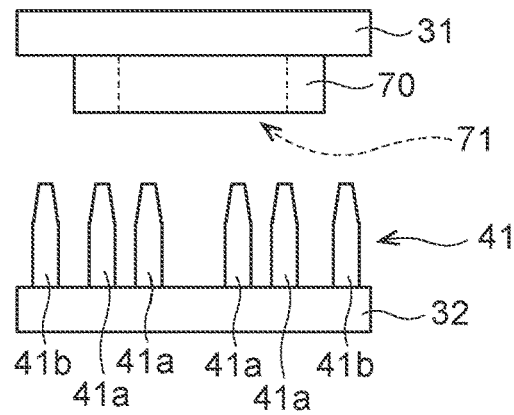
FIG. 15 is a side view showing a second example of a projecting portion which the first rotation unit includes.
Figure 16:
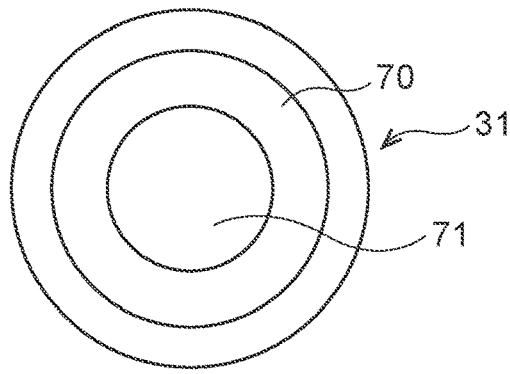
FIG. 16 is a bottom view showing the second example of the projecting portion which the first rotation unit includes.
Figure 17:
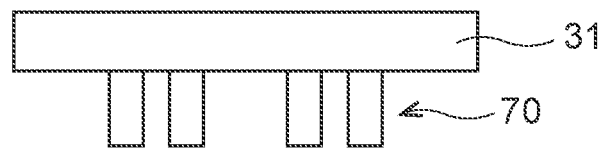
FIG. 17 is a side view showing a third example of a projecting portion which the first rotation unit includes.
Figure 18:
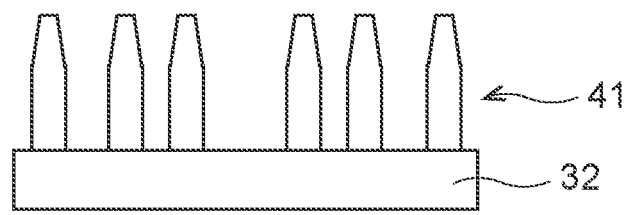
FIG. 18 is a bottom view showing the third example of the projecting portion which the first rotation unit includes.
Figure 18:
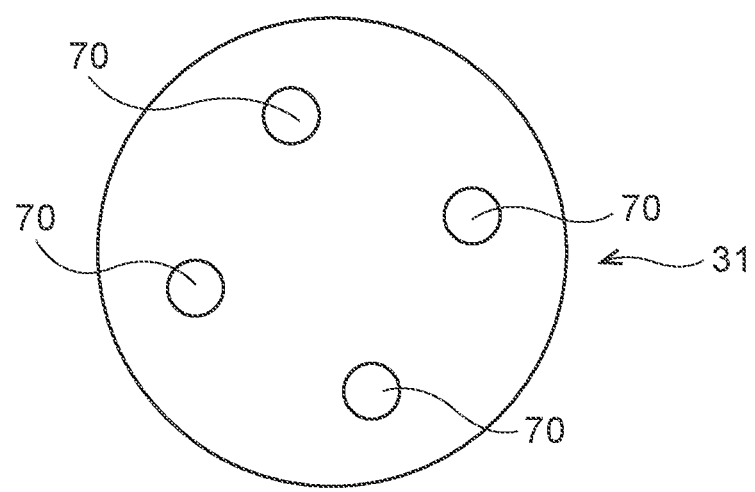

FIGS. 13, 15 and 17 are side views showing, respectively, first to third examples of a projecting portion(s) 70 that the first rotation unit 31 has. FIGS. 14, 16 and 18 are bottom views showing, respectively, the first to third examples of a projecting portion(s) 70 that the first rotation unit 31 has.

The first rotation unit 31 may include, for example, a projecting portion 70 having a circular ring shape the center of which is formed as a recess portion 71 as shown in FIGS. 13 to 16 (the first example and the second example). The first rotation unit 31 of the first example shown in FIGS. 13 and 14 has a single projecting portion 70 and the projecting portion 70 faces all the protrusion portions 41 (i.e., all the inner protrusion portions 41a and all the outer protrusion portions 41b) in the height direction. On the other hand, the first rotation unit 31 of the second example shown in FIGS. 15 and 16 also has a single projecting portion 70, and projecting portion 70 faces all the inner protrusion portions 41a in the height direction but does not face all the outer protrusion portions 41b.

In the first rotation unit 31, one projecting portion may face a plurality of protrusion portions 41 as in the first and second examples described above, or one projecting portion may face only one single protrusion portion 41. The first rotation unit 31 of the third example shown in FIGS. 17 and 18 has a plurality of columnar projecting portions 70 and these projecting portions 70 face the respective inner protrusion portions 41a in the height direction.

As described above, according to the present modification example, since the first rotation unit 31 has one or more projecting portions 70, the peelability of the first rotation unit 31 to a foodstuff workpiece W can be improved. In addition, since the contact area between a foodstuff workpiece W and the first rotation unit 31 is reduced, the adhesion of the shavings of a foodstuff workpiece W to the contact surface of the first rotation unit 31 can be reduced.

THIRD MODIFICATION EXAMPLE

Figure 19:
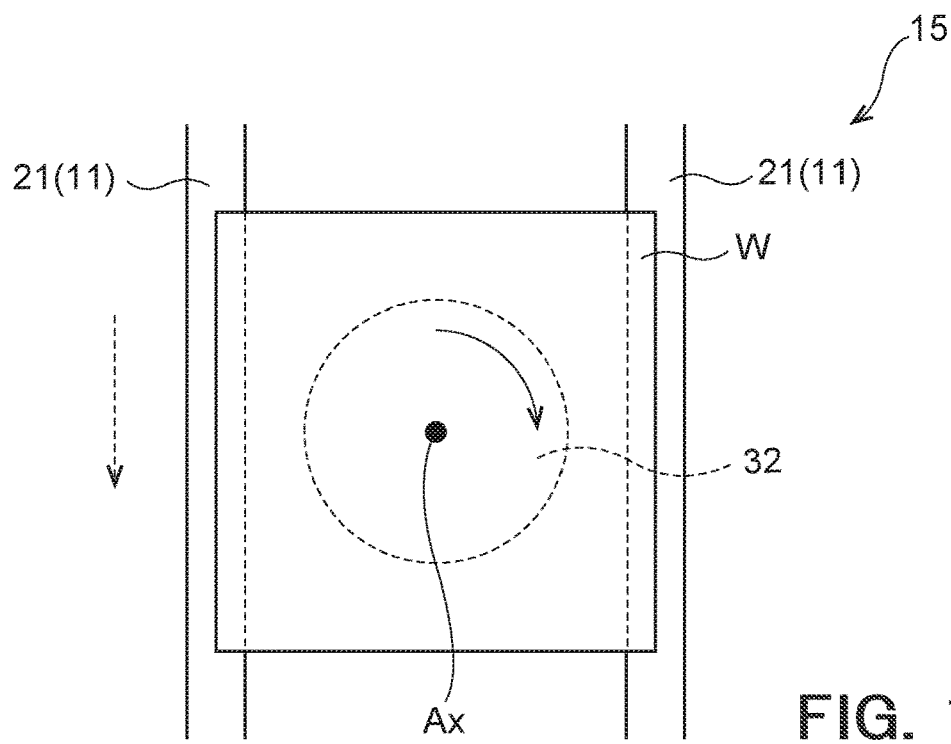
FIG. 19 is a plan view showing a rotation machine according to a third modification example.

FIG. 19 is a plan view showing a rotation machine 15 according to a third modification example. The present modification example is suitable for cases where the stiffness of a foodstuff workpiece W is relatively large. In particular, the present modification example is suitable for cases where a foodstuff workpiece W hardly flexes or flexes only to the extent that there is no problem even if only end parts the foodstuff workpiece W are supported by string-shaped members 21 (the first conveyor 11) as described below.

In the present modification example, the second rotation unit 32 has a disk shape and has a flat top surface that extends along a horizontal direction. The second rotation unit 32 is rotated around the rotation axis Ax and is raised and lowered in the height direction by the second movement rotation driving unit 54 (see FIG. 4, etc.), which is omitted in FIG. 19.

The first conveyor 11 includes at least two string-shaped members 21. The second rotation unit 32 is provided between two string-shaped members 21 with respect to a horizontal direction forming a right angle with the conveyance direction of a foodstuff workpiece W, and is provided to be able to be raised and lowered in a space between the two string-shaped members 21.

The first rotation unit 31 of the present modification example, which is omitted in FIG. 19, may be configured similarly to the second rotation unit 32 according to the present modification example or may be configured similar to the first rotation unit 31 of any of the embodiments or of the modification examples described above.

According to the present modification example, the second rotation unit 32 is raised to lift a foodstuff workpiece W from the string-shaped members 21 at a timing when the foodstuff workpiece W is positioned above the second rotation unit 32, and rotates the foodstuff workpiece W. On this occasion, the foodstuff workpiece W is rotated in a state of being sandwiched between the first rotation unit 31 and the second rotation unit 32. After the foodstuff workpiece W has been rotated, the second rotation unit 32 is lowered to place the foodstuff workpiece W on the string-shaped members 21.

FOURTH MODIFICATION EXAMPLE

Figure 20:
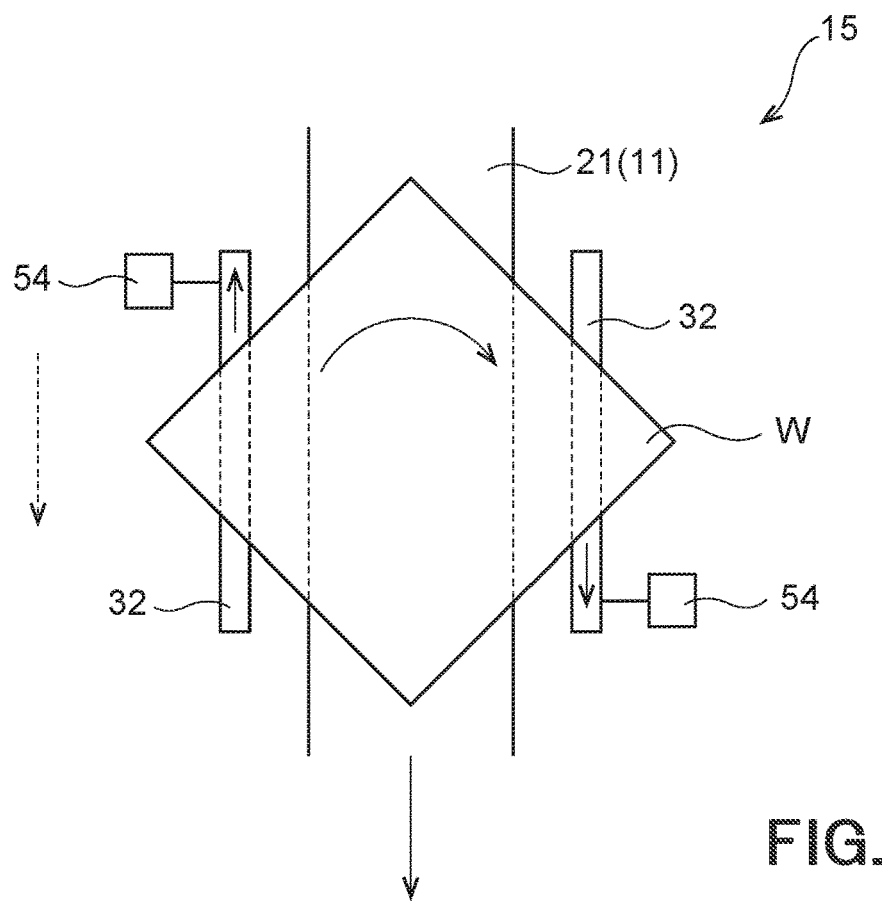
FIG. 20 is a plan view showing a rotation machine according to a fourth modification example.
Figure 21:
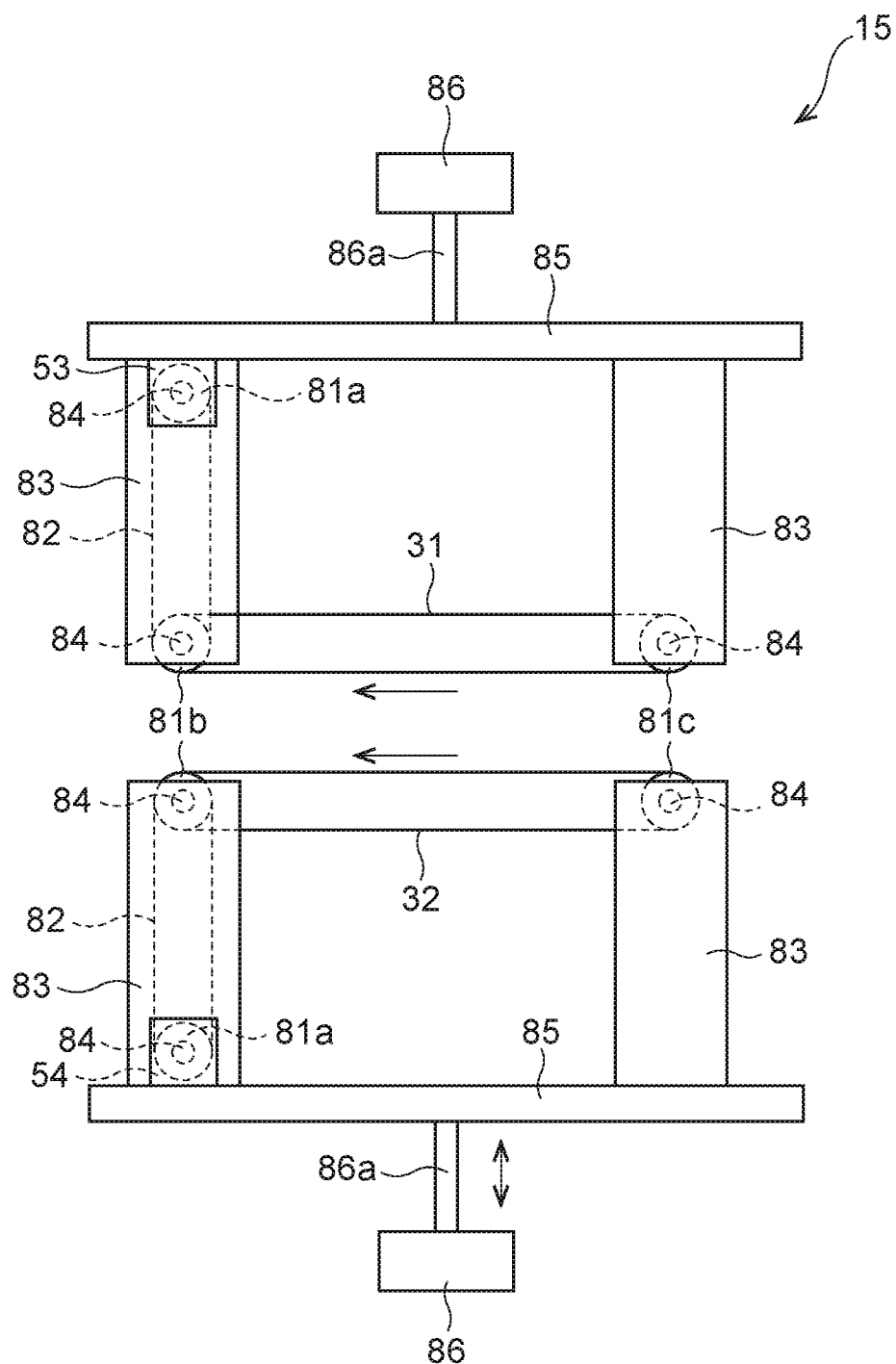
FIG. 21 is a side view showing the rotation machine according to the fourth modification example.

FIG. 20 is a plan view showing a rotation machine 15 according to a fourth modification example. FIG. 21 is a side view of the rotation machine 15 according to the fourth modification example. The rotation machine 15 is schematically shown in FIGS. 20 and 21. For example, in FIG. 20, the connection structure between a second rotation unit 32 and a second movement rotation driving unit 54 is simplified. Further, in FIG. 21, the illustration of the first conveyor 11 (the string-shaped members 21) and a foodstuff workpiece W is omitted.

The first conveyor 11 of the present modification example includes, as shown in FIG. 20, a string-shaped member 21 (hereinafter referred to as a "central string-shaped member 21") that supports the center part of a foodstuff workpiece W with respect to a horizontal direction forming a right angle with the conveyance direction of the foodstuff workpiece W. The central string-shaped member 21 shown in FIG. 20 has a relatively large width, but the width of the central string-shaped member 21 may be large or small as long as a foodstuff workpiece W can be properly supported and conveyed. Further, the first conveyor 11 may include a plurality of string-shaped members 21. For example, at an area upstream and/or an area downstream from the rotation machine 15, in addition to the central string-shaped member 21 shown in FIG. 20, another string-shaped member (not shown in the drawings) may be provided, as the first conveyor 11, at a position adjacent to this central string-shaped member 21.

A plurality of second rotation units 32 (in FIG. 20, two second rotation units 32) are provided and are arranged in such a manner that the first conveyor 11 is positioned between the plurality of second rotation units 32 with respect to a horizontal direction forming a right angle with the conveyance direction of a foodstuff workpiece W. Each second rotation unit 32 includes an endless belt that travels along the traveling direction of the first conveyor 11 and is driven by a corresponding second movement rotation driving unit 54 to travel in the direction corresponding to the rotation direction of a foodstuff workpiece W. Specifically, the surface of the second rotation unit 32 located on one side of the first conveyor 11 with respect to the horizontal direction forming a right angle with the conveyance direction of a foodstuff workpiece W (i.e., the second rotation unit 32 located on the right side in FIG. 20) which makes contact with a foodstuff workpiece W, travels in the same direction as the first conveyor 11. The surface of the second rotation unit 32 located on the other side of the first conveyor 11 with respect to the horizontal direction forming a right angle with the conveyance direction of a foodstuff workpiece W (i.e., the second rotation unit 32 located on the left side in FIG. 20) which makes contact with a foodstuff workpiece W, travels in the direction opposite to the first conveyor 11.

Each second rotation unit 32 is supported by a drive pulley 81b and a drive pulley 81c. Each of the drive pulley 81b and the drive pulley 81c is connected to a support body 83 via a rotation support shaft 84 so as to rotate freely. The support bodies 83 are each fixed onto a lifting-lowering plate 85, and the lifting-lowering plate 85 is supported by a lifting-lowering machine 86 (in particular, a lifting-lowering shaft 86a) so as to be able to be raised and lowered. The lifting-lowering machine 86 is fixedly supported by a support member which is not shown in the drawings.

A second movement rotation driving unit 54, which is formed by a motor, etc., is fixed to the lifting-lowering plate 85 and a support body 83. The second movement rotation driving unit 54 is connected to a drive pulley 81a via a rotation support shaft 84 and rotates the rotation support shaft 84 and the drive pulley 81a under the control of the control unit 50. A drive belt 82 is supported by the drive pulley 81a and the drive pulley 81b. The drive belt 82 travels in response to the rotation of the drive pulley 81a and transmits power, conveyed from the second movement rotation driving unit 54 via the rotation support shaft 84 and the drive pulley 81a, to the drive pulley 81b. The drive pulley 81b rotates in response to the traveling of the drive belt 82, and the second rotation unit 32 travels in response to the rotation of the drive pulley 81b.

Each second movement rotation driving unit 54 transmits power to the drive pulley (in the example shown FIG. 21, the drive pulley 81b on the left side) which is on the leading side in the traveling direction the corresponding second rotation unit 32, of the two drive pulleys 81b, 81c supporting the corresponding second rotation unit 32. This makes it possible to cause the second rotation unit 32 to travel in an energy-efficient manner.

The first rotation unit 31 has a similar configuration to the second rotation unit 32. Specifically, a plurality of first rotation units 31 (in the present modification example, two first rotation units 31) are provided and are arranged in such a manner that the first conveyor 11 is positioned between the plurality of first rotation units 31 with respect to a horizontal direction forming a right angle with the conveyance direction of a foodstuff workpiece W. Each first rotation unit 31 includes an endless belt that travels along the traveling direction of the first conveyor 11 and is driven by the corresponding first rotation driving unit 53 to travel in the direction corresponding to the rotation direction of a foodstuff workpiece W. Specifically, the contact surface with a foodstuff workpiece W of the first rotation unit 31 located on one side of the first conveyor 11 in the horizontal direction forming a right angle with the conveyance direction of a foodstuff workpiece W travels in the same direction as the first conveyor 11, and the contact surface with a foodstuff workpiece W of the first rotation unit 31 arranged on the other side travels in the opposite direction to the first conveyor 11. Each first rotation unit 31 is connected to the corresponding first rotation driving unit 53 via the rotation support shaft 84, the drive pulleys 81a, 81b, 81c and the drive belt 82, and travels by the power transmitted from the corresponding first rotation driving unit 53.

Each first rotation unit 31 is supported by the drive pulley 81b and the drive pulley 81c. Each of the drive pulley 81b and the drive pulley 81c is fixed onto a lifting-lowering plate 85 via a rotation support shaft 84 and a support body 83, and the lifting-lowering plate 85 is supported by a lifting-lowering machine 86 which is fixedly supported by a support member which is not shown in the drawings, so as to be able to be raised and lowered. Each first rotation driving unit 53 (a motor, etc.) is fixed to the lifting-lowering plate 85 and a support body 83. Each first rotation driving unit 53 is connected to the drive pulley 81a via a rotation support shaft 84 and rotates the rotation support shaft 84 and the drive pulley 81a under the control of the control unit 50. These drive pulleys 81a and 81b support a drive belt 82. The drive belt 82 travels in response to the rotation of the drive pulley 81a and transmits power, conveyed from the first rotation driving unit 53 via the rotation support shaft 84 and the drive pulley 81a, to the drive pulley 81b. The drive pulley 81b rotates in response to the traveling of the drive belt 82, and the first rotation unit 31 travels in response to the rotation of the drive pulley 81b.

According to the present modification example, the second rotation units 32 are raised to lift a foodstuff workpiece W from the string-shaped members 21 at a timing when the foodstuff workpiece W is positioned above the second rotation units 32, and rotate the foodstuff workpiece W. On this occasion, the foodstuff workpiece W is sandwiched between the first rotation units 31 and the second rotation units 32 and travels in the same direction (i.e., the leftward directions in FIG. 21) as the surfaces of the first rotation units 31 (i.e., the lower surfaces) and the surfaces of the second rotation units 32 (i.e., the upper surfaces) which are in contact with the foodstuff workpiece W. After the foodstuff workpiece W has been rotated, the second rotation units 32 are lowered to place the foodstuff workpiece W on the string-shaped members 21.

FIFTH MODIFICATION EXAMPLE

Figure 22:
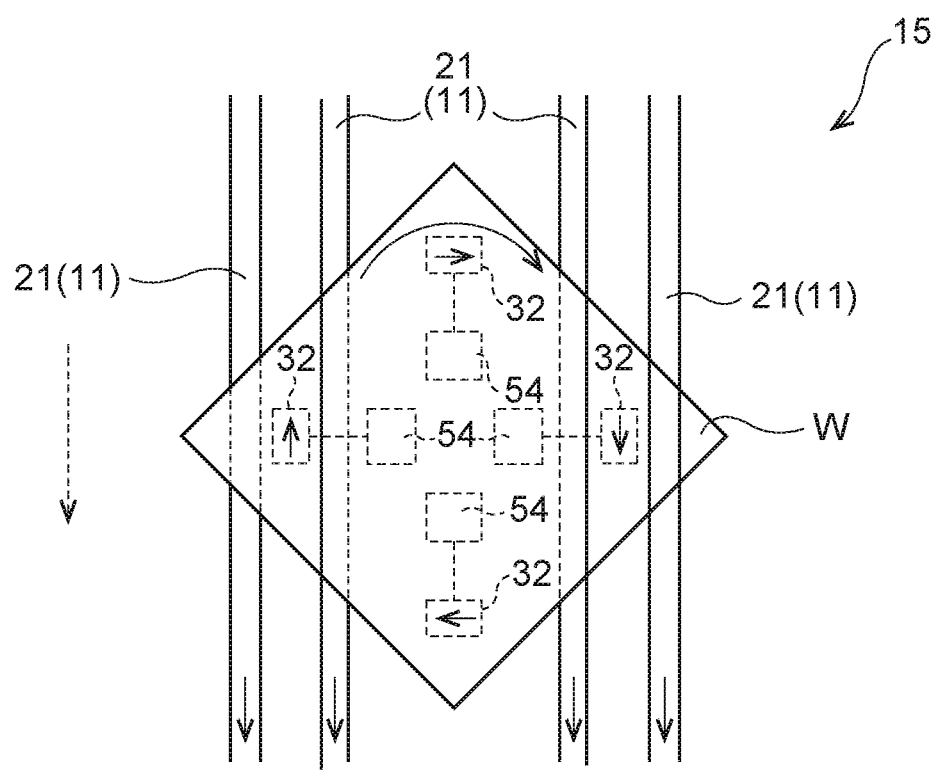
FIG. 22 is a plan view showing a rotation machine according to a fifth modification example.
Figure 23:
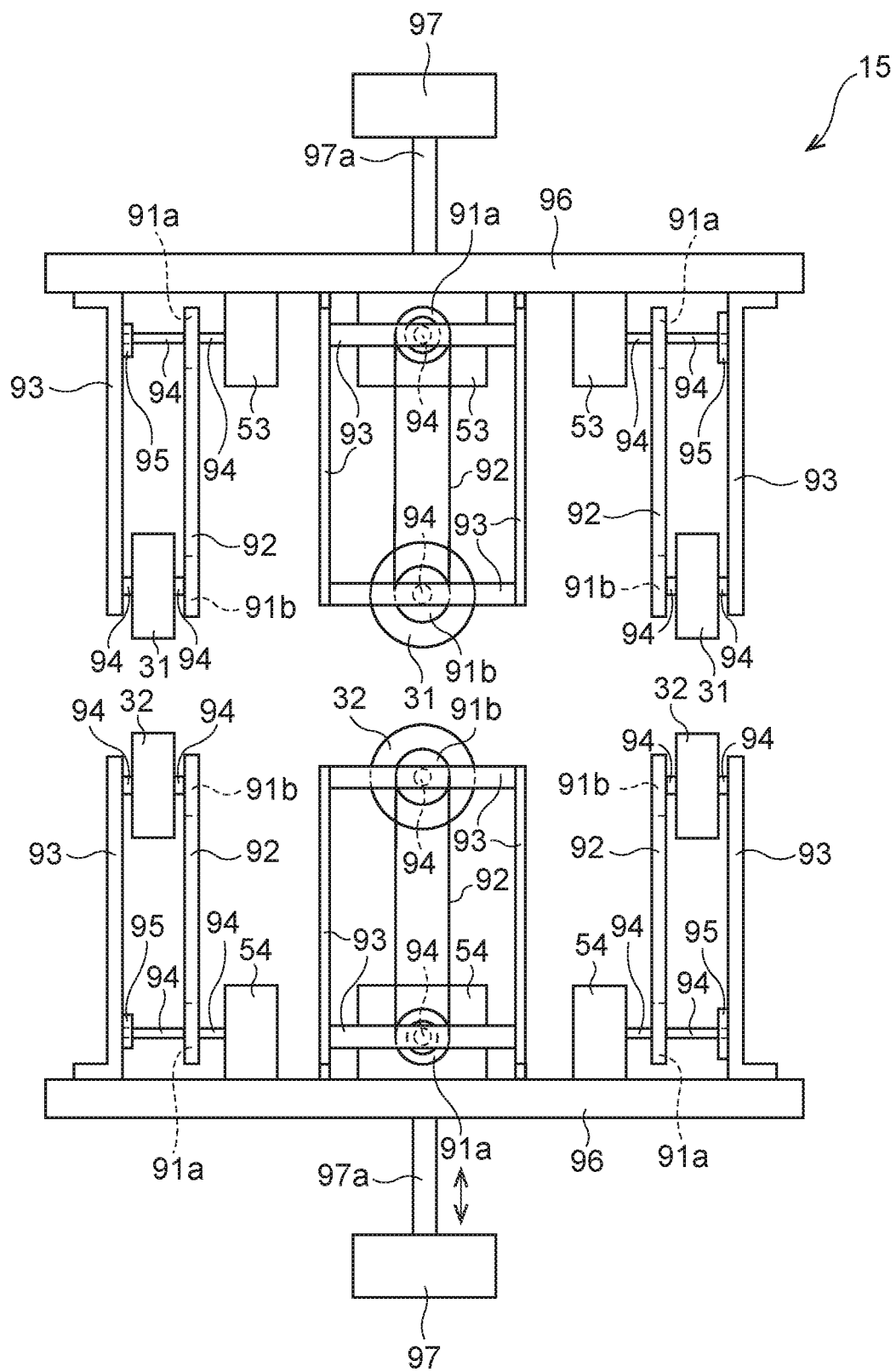
FIG. 23 is a side view showing the rotation machine according to the fifth modification example.

FIG. 22 is a plan view showing a rotation machine 15 according to a fifth modification example. FIG. 23 is a side view of the rotation machine 15 according to the fifth modification example. In FIGS. 22 and 23, the rotation machine 15 is schematically shown. For example, in FIG. 22, the connection structure between a second rotation unit 32 and a second movement rotation driving unit 54 is simplified. Further, in FIG. 21, the illustration of the first conveyor 11 (the string-shaped members 21) and a foodstuff workpiece W is omitted.

The first conveyor 11 of the present modification example includes a plurality of string-shaped members 21 as shown in FIG. 22 (in the example shown in the drawing, four string-shaped members 21) and supports both ends of a foodstuff workpiece W with respect to a horizontal direction forming a right angle with the conveyance direction of a foodstuff workpiece W. The first conveyor 11 may further include one or more string-shaped members 21 which are not shown in FIG. 22. For example, in addition to the four string-shaped members 21 shown in FIG. 22, a string-shaped member for supporting the central part of a foodstuff workpiece W may be provided at an area upstream and/or an area downstream from the rotation machine 15.

A plurality of second rotation units 32 (in FIG. 22, four second rotation units 32) are provided. The four second rotation units 32 are arranged equiangularly from each other around an axis (not shown in the drawings) extending in the height direction and are arranged at positions which are equidistant from this axis. Each second rotation unit 32 includes a roller that is driven to rotate by a corresponding second movement rotation driving unit 54, and rotates and travels in the direction corresponding to the rotation direction of a foodstuff workpiece W. Specifically, the direction of the rotation of one of the two second rotation units 32 positioned on the left and right sides in FIG. 22 (i.e., the second rotation unit 32 on the right side) corresponds to the traveling direction of the first conveyor 11 while the direction of rotation of the other (i.e., the second rotation unit 32 on the left side) corresponds to the opposite direction to the traveling direction of the first conveyor 11. Further, the two second rotation units 32 which are placed above and below in FIG. 22 correspond to horizontal directions which are perpendicular to the traveling direction of the first conveyor 11 but are in opposite directions to each other.

Each second rotation unit 32 is supported by a support unit 93 via a rotation support shaft 94 so as to rotate freely and is connected to a drive pulley 91b via the rotation support shaft 94. The support unit 93 supports a drive pulley 91a so as to rotate freely, via a bearing holder 95 and a rotation support shaft 94. The drive pulley 91a is connected to a second movement rotation driving unit 54, which is formed by a motor, etc., via the rotation support shaft 94. Each second movement rotation driving unit 54 is fixed to a lifting-lowering plate 96 and is driven under the control of the control unit 50. The lifting-lowering plate 96 is supported by a lifting-lowering machine 97 (in particular, a lifting-lowering shaft 97a) so as to be able to be raised or lowered. The lifting-lowering machine 97 is controlled by the control unit 50.

The first rotation unit 31 also has a similar configuration to the second rotation unit 32. Specifically, a plurality of first rotation units 31 (in the example shown in the drawings, four first rotation units 31) are provided, are arranged at equal angular intervals with respect to each other around an axis (not shown in the drawings) extending in the height direction, are arranged at positions which are equidistant from this axis, and are provided at positions facing the second rotation units 32 respectively. Each first rotation unit 31 has a roller that is driven to rotate by a corresponding first rotation driving unit 53, and travels in the direction corresponding to the rotation direction of a foodstuff workpiece W.

Each first rotation unit 31 is supported by a support unit 93 via a rotation support shaft 94 so as to rotate freely and is connected to a drive pulley 91b via a rotation support shaft 94. The support unit 93 supports a drive pulley 91a to as to rotate freely, via a bearing holder 95 and a rotation support shaft 94. The drive pulley 91a is connected to a first rotation driving unit 53, which is formed by a motor, etc., via the rotation support shaft 94. Each first rotation driving unit 53 is fixed to a lifting-lowering plate 96 and is driven under the control of the control unit 50.

According to the present modification example, the second rotation units 32 are raised to lift a foodstuff workpiece W from the string-shaped members 21 at a timing when the foodstuff workpiece W is positioned above the second rotation units 32, and rotates the foodstuff workpiece W. On this occasion, the foodstuff workpiece W is sandwiched between the first rotation units 31 and the second rotation units 32 and travels in the same direction as the surfaces of the first rotation units 31 and the surfaces of the second rotation units 32 which are in contact with the foodstuff workpiece W. After the foodstuff workpiece W has been rotated, the second rotation unit 32 is lowered to place the foodstuff workpiece W on the string-shaped members 21.

SIXTH MODIFICATION EXAMPLE

Figure 24:
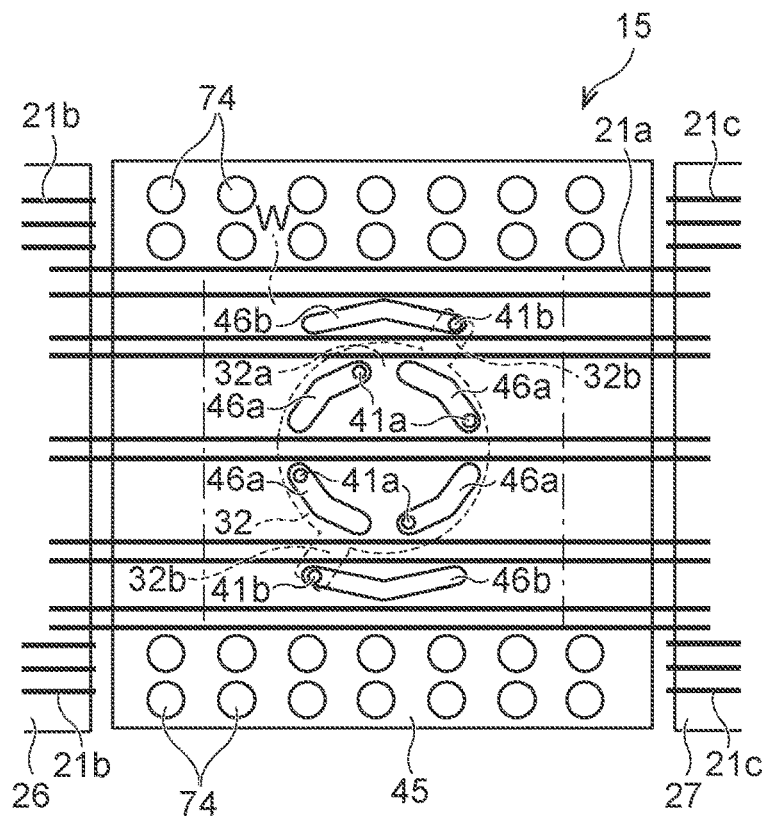
FIG. 24 is a plan view showing one example of a rotation machine according to a sixth modification example.
Figure 25:
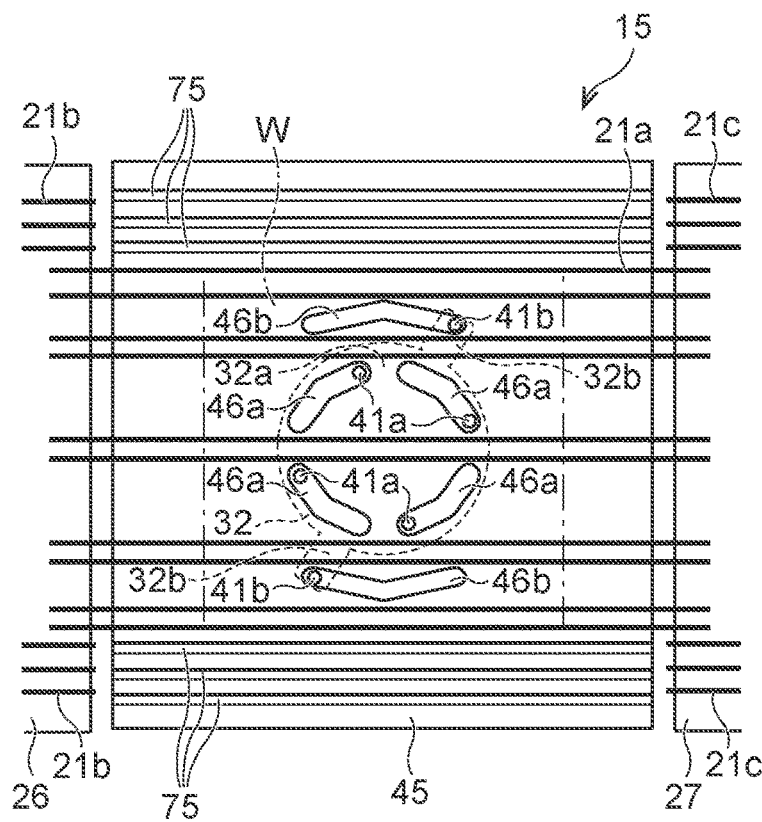
FIG. 25 is a plan view showing another example of the rotation machine according to the sixth modification example.

FIG. 24 is a plan view showing an example of a rotation machine 15 according to a sixth modification example. FIG. 25 is a plan view showing another example of the rotation machine 15 according to the sixth modification example.

The guiding plate 45 may have an opening formation portion that forms an opening in the surface of the guiding plate 45 (in particular, in the surface facing a foodstuff workpiece W being conveyed). The opening formation portion may penetrate through the guide plate 45 or may be provided as a depressed portion that does not penetrate the guide plate 45. Therefore, the guide plate 45 may have, as such an opening formation portion, a through hole 74 (see FIG. 24), may have a bottomed groove 75 (see FIG. 25), or may have both a through hole and a depressed portion, for example. The through holes 74 shown in FIG. 24 have a circular planar shape, and the grooves 75 shown in FIG. 25 extend along the conveyance direction of a foodstuff workpiece W, but the shape, position, and extending direction of the opening formation portion are not limited.

The fact that the guide plate 45 has an opening formation portion makes it possible to reduce the surface area of the guide plate 45 that can contact a foodstuff workpiece W, thereby reducing the force (frictional force and adhesive force, etc.) that a foodstuff workpiece W receives from the guide plate 45. In particular, in cases where the moisture content of a foodstuff workpiece W is high or a foodstuff workpiece W is formed by an adhesive foodstuff, by making the surface area of the guide plate 45 that can come into contact with a foodstuff workpiece W small, the force that a foodstuff workpiece W receives from the guide plate 45, such as frictional force and adhesive force, can be effectively reduced.

A foodstuff workpiece W tends to come into contact with parts of the guide plate 45 above which the string-shaped members 21 are not provided (in other words, exposed parts). Therefore, by providing opening formation portions in parts of the guide plate 45 that are not covered with the string-shaped members 21, the force that a foodstuff workpiece W receives from the guide plate 45 can be efficiently reduced. On the other hand, exposed parts of the guide plate 45 support a foodstuff workpiece W from below in rotating the foodstuff workpiece W at a position above the guide plate 45, which helps to rotate the foodstuff workpiece W stably. Therefore, by providing opening formation portions discretely in the guide plate 45 (for example, in exposed parts), it is possible to achieve both the reduction of the force received by a foodstuff workpiece W from the guide plate 45 and the support of a foodstuff workpiece W by the guide plate 45 in a well-balanced manner.

OTHER MODIFICATION EXAMPLES

The present invention is not limited to the embodiments and the modification examples described above.

For example, the first conveyor 11 of the first embodiment described above is formed by a plurality of string-shaped members 21 but may be formed by other members (for instance, a belt member, a roller-shaped member, or a net-shaped member) instead of the plurality of string-shaped members 21.

Further, the first rotation unit 31 in the second modification example described above has one or more project portions 70 facing the plurality of protrusion portions 41, but the first rotation unit 31 may have a shape and a size such that the whole of the first rotation unit 31 faces only one or more protrusion portions 41 of the second rotation unit 32 (in other words, a shape and a size such that the whole of the first rotation unit 31 does not face the parts other than the one or more protrusion portions 41 of the second rotation unit 32).

Further, the control unit 50 may control each of the first movement driving unit 52 and the first rotation driving unit 53 provided separately and may control each of the second movement driving unit 55 and the second rotation driving unit 56 provided separately, instead of controlling the first movement rotation driving unit 51 and the second movement rotation driving unit 54.

Further, the specific number and the arrangement manner of the inner protrusion portions 41a and the outer protrusion portions 41b are not limited, and the shape of the main body part of the second rotation unit 32 that supports the inner protrusion portions 41a and the outer protrusion portions 41b is also not limited. For example, the inner protrusion portions 41a and the outer protrusion portions 41b may be supported by the main body part of the second rotation unit 32 which has a disk shape having no protrusion portions.

Further, it is possible to provide the second rotation unit 32 to be passively rotatable and to provide the first rotation unit 31 to be actively rotatable. It is possible that, in a state where the first rotation unit 31 and the second rotation unit 32 are nipping and holding a foodstuff workpiece W, one of the first rotation unit 31 and the second rotation unit 32 is actively rotated while the other is passively rotated.

Further, at least one of the first rotation unit 31 and the second rotation unit 32 may have a plurality of protrusion portions (see the "protrusion portions 41" described above) extending from one of the first rotation unit 31 and the second rotation unit 32 to the other. Therefore, of the first rotation unit 31 and the second rotation unit 32, only the first rotation unit 31 may have a plurality of protrusion portions, or only the second rotation unit 32 may have a plurality of protrusion portions, or both may have a plurality of protrusion portions.

One of the first rotation unit 31 and the second rotation unit 32 may project toward the other of the first rotation unit 31 and the second rotation unit 32 and may have one or more projecting portions 70 facing the plurality of protrusion portions 41 that the other includes. Thus, the first rotation unit 31 may have a plurality of protrusion portions and the second rotation unit 32 may have one or more projecting portions 70.

Further, when a foodstuff workpiece W is rotated by the rotation machine 15, the foodstuff workpiece W does not necessarily have to be lifted from the first conveyor 11. The rotation machine 15 may rotate a foodstuff workpiece W in a state where the foodstuff workpiece W is in contact with the first conveyor 11.

For example, a foodstuff workpiece W may be rotated by actively rotating at least one of the first rotation unit 31 and the second rotation unit 32 while the foodstuff workpiece W is sandwiched and held by the first rotation unit 31 arranged on the upper side and the second rotation unit 32 which is arranged on the lower side and has a plurality of protrusion portions (in particular, the protrusion portions) in a state where the foodstuff workpiece W is in contact with the first conveyor 11. Further, a foodstuff workpiece W may be rotated by actively rotating at least one of the first rotation unit 31 and the second rotation unit 32 while the foodstuff workpiece W is sandwiched and held by the first rotation unit 31 which is arranged on the upper side and has a plurality of protrusion portions (in particular, the protrusion portions) and the second rotation unit 32 arranged on the lower side in a state where the foodstuff workpiece W is in contact with the first conveyor 11. Moreover, a foodstuff workpiece W may be rotated by actively rotating at least one of the first rotation unit 31 and the second rotation unit 32 while the foodstuff workpiece W is sandwiched and held by the first rotation unit 31 which is arranged on the upper side and has a plurality of protrusion portions (in particular, the protrusion portions) and the second rotation unit 32 which is arranged on the lower side and has a plurality of protrusion portions (in particular, the protrusion portions) in a state where the foodstuff workpiece W is in contact with the first conveyor 11.

At least some of the configurations and actions of the first rotation unit 31 and the second rotation unit 32 described above are interchangeable with each other.

In the above-mentioned embodiments and modification examples, food production apparatuses 10 and food production methods which produce spring rolls are described, the food production apparatuses 10 and the food production methods may also produce other food products, and the rotation machine 15 may rotate foodstuff workpieces other than skins of spring rolls. For example, the food production apparatuses 10 and the food production methods may produce "shao mai" which is a kind of raviolis a la vapeur and "jiao-zi" which is a kind of dumplings, and the rotation machine 15 may produce skins of the "shao mai" and the "jiao-zi". Further, the rotation machine 15 may also rotate foodstuff workpieces other than skins that wrap ingredients. The food production apparatuses 10 (including the rotation machines 15) and the food production methods (including the rotation methods) according to the above-mentioned embodiments and modification examples are suitable for a foodstuff workpiece W formed by a flexible sheet-shaped foodstuff but may be applied also to a foodstuff workpiece W formed by a foodstuff having a relatively large rigidity and to a foodstuff workpiece W formed by a non-sheet-shaped foodstuff.

Various modifications may be applied to each of the elements of the above-mentioned embodiments and the modification examples. Further, the embodiments of the present disclosure include aspects including a component and/or a method other than the above-described components and/or methods. Further, the embodiments of the present disclosure also include aspects not comprising some of the above-described components and/or methods. Further, the embodiments of the present disclosure also include aspects comprising some of the components and/or methods included in a certain embodiment of the present disclosure and some of the components and/or methods included in another embodiment of the present disclosure. Therefore, the components and/or the methods included in each of the above-described embodiments and modification examples as well as embodiments of the present disclosure other than those described above, may be combined with each other, and aspects according to such combinations are also included in the embodiments of the present disclosure. Further, the effects brough about by the present disclosure are also not limited to the effects described above, and specific effects based on the specific configuration of each embodiment may also be exerted. As described above, various additions, changes and partial deletions can be made to each element described in the claims, specification, abstract, and drawings within the scope not departing from the technical idea and the purpose of the present disclosure.

REFERENCE SIGNS LIST

10 Food production apparatus
11 First conveyor
12 Second conveyor
13 Third conveyor
14 Cutting Unit
15 Rotation machine
16 Food processing machine
17 Roll-up prevention unit
21 String-shaped member
21a First string-shaped member
21b Second string-shaped member
21c Third string-shaped member
22 Second conveyor transfer section
23 Third conveyor transfer section
24 Second conveyor roller
25 Third conveyor roller
26 First return roller
27 Second return roller
31 First rotation unit
32 Second rotation part
35 lifting-lowering guide
36 First lifting-lowering elastic member
37 Elastic stopper
38 Passive rotation unit
39 Support shaft
41 Protrusion portion
41a Inner protrusion portion
41b Outer protrusion portion
45 Guide plate
46a Inner movement hole
46b Outer movement hole
50 Control unit
51 First movement rotation driving unit
52 First movement driving unit
53 First rotation driving unit
53a First rotation shaft
54 Second movement rotation driving unit
54a Second moving rotation shaft
55 Second movement driving unit
56 Second rotation driving unit
61 Second lifting-lowering elastic unit
70 Projecting portion
71 Recess portion
74 Through hole
75 Groove
81a Drive pulley
81b Drive pulley
81c Drive pulley
82 Drive belt
83 Support body
84 Rotation support shaft
85 Lifting-lowering plate
86 Lifting-lowering machine
86a Lifting-lowering shaft
91a Drive pulley
91b Drive pulley
92 Drive belt
93 Support unit
94 Rotation support shaft
95 Bearing holder
96 Lifting-lowering plate
97 Lifting-lowering machine
97a Lifting-lowering shaft
Ax Rotation axis
W Foodstuff workpiece
W0 Dough

The invention claimed is:

1. A food production apparatus comprising:
a first conveyor which conveys a foodstuff workpiece;
a rotation machine which rotates the foodstuff workpiece; and
a control unit that controls the rotation machine, wherein:
the rotation machine includes; a first rotation unit and a second rotation unit which are provided to be actively rotatable, at least any one of the first rotation unit and the second rotation unit being provided to be movable in such a manner that a distance of the first rotation unit and the second rotation unit is variable; and a lifting-lowering elastic member comprising a member which is able to be elastically compressed in a height direction,
the control unit controls rotation of both the first rotation unit and the second rotation unit and movement of at least any one of the first rotation unit and the second rotation unit in such a manner that:
at least any one of the first rotation unit and the second rotation unit is moved in such a manner that the foodstuff workpiece is nipped and held by the first rotation unit and the second rotation unit and that the lifting-lowering elastic member prevents excessive force from acting on the foodstuff workpiece between the first rotation unit and the second rotation unit;
the first rotation unit and the second rotation unit in a state of nipping and holding the foodstuff workpiece are actively rotated in synchronization with each other; and
at least any one of the first rotation unit and the second rotation unit is moved to release the foodstuff workpiece from the first rotation unit and the second rotation unit;
the second rotation unit is provided at a position facing the first rotation unit and includes a plurality of protrusion portions extending toward the first rotation unit; and
the plurality of protrusion portions include: two or more inner protrusion portions provided at positions which are relatively close to a rotation axis of the second rotation unit; and one or more outer protrusion portions which are relatively far apart from the rotation axis of the second rotation unit.

2. The food production apparatus as defined in claim 1, wherein:
the first conveyor includes a plurality of string-shaped members, and
when the first rotation unit and the second rotation unit nip and hold the foodstuff workpiece, the plurality of protrusion portions penetrate between string-shaped members and lift the foodstuff workpiece from the first conveyor.

3. The food production apparatus as defined in claim 1, further comprising:
a foodstuff workpiece supply unit which sends out the foodstuff workpiece; and a second conveyor which receives from above the foodstuff workpiece sent out from the foodstuff workpiece supply unit and delivers the foodstuff workpiece to the first conveyor, wherein, per unit length in a conveyance direction of the foodstuff workpiece, a contact area between the second conveyor and the foodstuff workpiece placed on the second conveyor is larger than a contact area between the first conveyor and the foodstuff workpiece placed on the first conveyor.

4. The food production apparatus as defined in claim 3, wherein a distance between the second conveyor and the first conveyor is set to a distance such that in a state where a part of the foodstuff workpiece is placed on the second conveyor, another part of the foodstuff workpiece lands on the first conveyor.

5. A food production apparatus comprising:
a first conveyor which includes a plurality of string-shaped members and conveys a foodstuff workpiece;
a rotation machine which rotates the foodstuff workpiece; and
a control unit which controls the rotation machine, wherein:
the rotation machine includes:
a first rotation unit;
a second rotation unit which is provided at a position facing the first rotation unit and includes a plurality of protrusion portions extending toward the first rotation unit, and
a lifting-lowering elastic member comprising a member which is able to be elastically compressed in a height direction,
one of the first rotation unit and the second rotation unit is provided to be able to rotate actively, and the other is provided to be able to rotate passively,
the control unit controls movement and rotation of at least any one of the first rotation unit and the second rotation unit in such a manner that:
the first rotation unit and the second rotation unit nip and hold the foodstuff workpiece and the lifting-lowering elastic member prevents excessive force from acting on the foodstuff workpiece between the first rotation unit and the second rotation unit;
one of the first rotation unit and the second rotation unit is actively rotated in a state where the first rotation unit and the second rotation unit nip and hold the foodstuff workpiece; and
the foodstuff workpiece is released from the first rotation unit and the second rotation unit, and
the plurality of protrusion portions include: two or more inner protrusion portions provided at positions which are relatively close to a rotation axis of the second rotation unit; and one or more outer protrusion portions which are relatively far apart from the rotation axis of the second rotation unit.

6. The food production apparatus as defined in claim 5, further comprising:
a foodstuff workpiece supply unit which sends out the foodstuff workpiece; and
a second conveyor which receives from above the foodstuff workpiece sent out from the foodstuff workpiece supply unit and delivers the foodstuff workpiece to the first conveyor,
wherein, per unit length in a conveyance direction of the foodstuff workpiece, a contact area between the second conveyor and the foodstuff workpiece placed on the second conveyor is larger than a contact area between the first conveyor and the foodstuff workpiece placed on the first conveyor.

7. The food production apparatus as defined in claim 6, wherein a distance between the second conveyor and the first conveyor is set to a distance such that in a state where a part of the foodstuff workpiece is placed on the second conveyor, another part of the foodstuff workpiece lands on the first conveyor.

8. A food production apparatus comprising:
a first conveyor which conveys a foodstuff workpiece;
a rotation machine which rotates the foodstuff workpiece; and
a control unit that controls the rotation machine, wherein:
the rotation machine includes a first rotation unit and a second rotation unit which are provided to be actively rotatable, at least any one of the first rotation unit and the second rotation unit being provided to be movable in such a manner that a distance of the first rotation unit and the second rotation unit is variable,
the control unit controls rotation of both the first rotation unit and the second rotation unit and movement of at least any one of the first rotation unit and the second rotation unit in such a manner that:
at least any one of the first rotation unit and the second rotation unit is moved in such a manner that the foodstuff workpiece is nipped and held by the first rotation unit and the second rotation unit;
the first rotation unit and the second rotation unit in a state of nipping and holding the foodstuff workpiece are actively rotated in synchronization with each other; and
at least any one of the first rotation unit and the second rotation unit is moved to release the foodstuff workpiece from the first rotation unit and the second rotation unit,
the first conveyor includes a plurality of string-shaped members,
the second rotation unit is provided at a position facing the first rotation unit and includes a plurality of protrusion portions extending toward the first rotation unit,
when the first rotation unit and the second rotation unit nip and hold the foodstuff workpiece, the plurality of protrusion portions penetrate between string-shaped members and lift the foodstuff workpiece from the first conveyor, and
the first rotation unit includes one or more projecting portions which project toward the second rotation unit and face the plurality of protrusion portions.

9. A rotation method of rotating a foodstuff workpiece, comprising the steps of:
moving at least any one of a first rotation unit and a second rotation unit in such a manner that the first rotation unit and the second rotation unit nip and hold the foodstuff workpiece and that a lifting-lowering elastic member comprising a member which is able to be elastically compressed in a height direction prevents excessive force from acting on the foodstuff workpiece between the first rotation unit and the second rotation unit;
actively rotating the first rotation unit and the second rotation unit which nip and hold the foodstuff workpiece in synchronization with each other; and
moving at least any one of the first rotation unit and the second rotation unit to release the foodstuff workpiece from the first rotation unit and the second rotation unit, wherein the second rotation unit is provided at a position facing the first rotation unit and includes a plurality of protrusion portions extending toward the first rotation unit, and wherein the plurality of protrusion portions include: two or more inner protrusion portions provided at positions which are relatively close to a rotation axis of the second rotation unit; and one or more outer protrusion portions which are relatively far apart from the rotation axis of the second rotation unit.

10. A rotation method of rotating a foodstuff workpiece, comprising the steps of:

conveying the foodstuff workpiece by a first conveyor including a plurality of string-shaped members, a first rotation unit and a second rotation unit being provided to face each other, the second rotation unit including a plurality of protrusion portions extending toward the first rotation unit;

moving at least any one of the first rotation unit and the second rotation unit in such a manner that the foodstuff workpiece is nipped and held by the first rotation unit and the second rotation unit and that a lifting-lowering elastic member comprising a member which is able to be elastically compressed in a height direction prevents excessive force from acting on the foodstuff workpiece between the first rotation unit and the second rotation unit;

actively rotating one of the first rotation unit and the second rotation unit while the other rotates passively, in a state where the first rotation unit and the second rotation unit nip and hold the foodstuff workpiece; and moving at least any one of the first rotation unit and the second rotation unit in such a manner that the foodstuff workpiece is released from the first rotation unit and the second rotation unit, wherein the plurality of protrusion portions include: two or more inner protrusion portions provided at positions which are relatively close to a rotation axis of the second rotation unit; and one or more outer protrusion portions which are relatively far apart from the rotation axis of the second rotation unit.

11. A food production method of rotating a foodstuff workpiece, comprising the steps of:

moving at least any one of a first rotation unit and a second rotation unit in such a manner that the foodstuff workpiece is nipped and held by the first rotation unit and the second rotation unit and that excessive force is prevented from acting on the foodstuff workpiece between the first rotation unit and the second rotation unit by a lifting-lowering elastic member comprising a member which is able to be elastically compressed in a height direction;

actively rotating the first rotation unit and the second rotation unit which nip and hold the foodstuff workpiece in synchronization with each other; and moving at least any one of the first rotation unit and the second rotation unit in such a manner that the foodstuff workpiece is released from the first rotation unit and the second rotation unit, wherein the second rotation unit is provided at a position facing the first rotation unit and includes a plurality of protrusion portions extending toward the first rotation unit, and wherein the plurality of protrusion portions include: two or more inner protrusion portions provided at positions which are relatively close to a rotation axis of the second rotation unit; and one or more outer protrusion portions which are relatively far apart from the rotation axis of the second rotation unit.

12. A food production method of rotating a foodstuff workpiece, comprising the steps of:

conveying the foodstuff workpiece by a first conveyor including a plurality of string-shaped members, a first rotation unit and a second rotation unit being provided to face each other, the second rotation unit including a plurality of protrusion portions extending toward the first rotation unit;

moving at least any one of the first rotation unit and the second rotation unit in such a manner that the foodstuff workpiece is nipped and held by the first rotation unit and the second rotation unit and that excessive force is prevented from acting on the foodstuff workpiece between the first rotation unit and the second rotation unit by a lifting-lowering elastic member comprising a member which is able to be elastically compressed in a height direction;

actively rotating one of the first rotation unit and the second rotation unit while the other rotates passively, in a state where the first rotation unit and the second rotation unit nip and hold the foodstuff workpiece; and moving at least any one of the first rotation unit and the second rotation unit in such a manner that the foodstuff workpiece is released from the first rotation unit and the second rotation unit, wherein the plurality of protrusion portions include: two or more inner protrusion portions provided at positions which are relatively close to a rotation axis of the second rotation unit; and one or more outer protrusion portions which are relatively far apart from the rotation axis of the second rotation unit.

13. A food production apparatus comprising:

a first conveyor which includes a plurality of string-shaped members and conveys a foodstuff workpiece;

a rotation machine which rotates the foodstuff workpiece; and a control unit which controls the rotation machine, wherein:

the rotation machine includes:
  a first rotation unit; and
  a second rotation unit which is provided at a position facing the first rotation unit and includes a plurality of protrusion portions extending toward the first rotation unit, one of the first rotation unit and the second rotation unit is provided to be able to rotate actively, and the other is provided to be able to rotate passively, the control unit controls movement and rotation of at least any one of the first rotation unit and the second rotation unit in such a manner that:
  the first rotation unit and the second rotation unit nip and hold the foodstuff workpiece;
  one of the first rotation unit and the second rotation unit is actively rotated in a state where the first rotation unit and the second rotation unit nip and hold the foodstuff workpiece; and
  the foodstuff workpiece is released from the first rotation unit and the second rotation unit, and the first rotation unit includes one or more projecting portions which project toward the second rotation unit and face the plurality of protrusion portions.

* * * * *